(12) United States Patent
Yu et al.

(10) Patent No.: US 8,872,377 B2
(45) Date of Patent: Oct. 28, 2014

(54) AUTOTRANSFORMER TRACTION POWER SUPPLY SYSTEM EQUIPPED WITH 2×27.5KV OUTDOOR MODULARIZED ELECTRIC APPARATUS IN ELECTRIFIED RAILWAY

(75) Inventors: Jiahua Yu, Wuhan (CN); Beidou Zhang, Shanghai (CN)

(73) Assignee: Zhaorong Industry Development (Shanghai) Co., Ltd., Shanghai (CN)

( * ) Notice: Subject to any disclaimer, the term of this patent is extended or adjusted under 35 U.S.C. 154(b) by 567 days.

(21) Appl. No.: 13/263,952

(22) PCT Filed: Apr. 30, 2009

(86) PCT No.: PCT/CN2009/071594
§ 371 (c)(1),
(2), (4) Date: Feb. 7, 2012

(87) PCT Pub. No.: WO2010/118584
PCT Pub. Date: Oct. 21, 2010

(65) Prior Publication Data
US 2012/0126622 A1    May 24, 2012

(30) Foreign Application Priority Data
Apr. 16, 2009  (CN) .......................... 2009 1 0097681

(51) Int. Cl.
*B60L 1/00*      (2006.01)
*B60M 3/04*     (2006.01)

(52) U.S. Cl.
CPC ...................................... *B60M 3/04* (2013.01)
USPC .......................................................... 307/9.1

(58) Field of Classification Search
USPC ................... 307/9.1; 191/23 A, 33 R
See application file for complete search history.

(56) References Cited

FOREIGN PATENT DOCUMENTS

| CN | 2574937 Y | 9/2003 |
| CN | 2803804 Y | 8/2006 |
| CN | 2857285 Y | 1/2007 |
| DE | 3527309 A1 | 2/1987 |
| JP | 2001-267054 A | 9/2001 |

OTHER PUBLICATIONS

Ning, J. "Research of a box section post and its intelligent power supply monitoring & control system", Sep. 2004, 24(9):67-70, ISSN 1006-6047.
Xiong, L. "Protection and control scheme of feeder in parallel autotransformer power-supply systems", Nov. 25, 2006, 30(22): 73-76, ISSN 1000-1026.
International Search Report in International Application No. PCT/CN2009/071594, filed Apr. 30, 2009.

*Primary Examiner* — Daniel Cavallari
(74) *Attorney, Agent, or Firm* — Saliwanchik, Lloyd & Eisenschenk

(57) ABSTRACT

An autotransformer (AT) traction power supply system equipped with 2×27.5 kV outdoor modularized electric apparatus comprises a traction substation located beside an electrified railway, which connects with an up and a down line traction network at output terminal, a parallel apparatus located in the middle and the end of a feeder in the up and down line traction network, which functions as parallel power supply operation, and an over-zone apparatus located around a neutral section insulator between feeders of the up and down line traction network of two adjacent traction substations, which functions as over-zone power supply operation. The parallel apparatus connected with an AT equipment is a modularized electric apparatus which comprises four parallel power supply units. The AT equipment comprises four integrated AT substations which include the first AT, the second AT and an AT modularized electric apparatus.

12 Claims, 16 Drawing Sheets

AUTOTRANSFORMER TRACTION POWER SUPPLY SYSTEM EQUIPPED WITH 2×27.5KV OUTDOOR MODULARIZED ELECTRIC APPARATUS IN ELECTRIFIED RAILWAY

CROSS-REFERENCE TO RELATED APPLICATIONS

This application is the U.S. national stage application of International Patent Application No. PCT/CN2009/071594, filed Apr. 30, 2009, which claims priority to Chinese Application No. 200910097681.7, filed Apr. 16, 2009, the disclosures of each of which are incorporated herein by reference in their entirety.

THE TECHNICAL FIELD OF THE INVENTION

The invention relates to an autotransformer (AT) traction power supply system in an electrified railway.

THE BACKGROUND TECHNICAL OF THE INVENTION

A 2×27.5 kV AT power supply method is mainly used for a traction power supply system in an electrified railway, such as high speed railways at home and abroad, passenger dedicated lines, heavy haul railways and so on, to meet the traction electricity requirement of an electric locomotive. The traction power supply system of the AT power supply method mainly consists of a traction substation, a section post, an AT post and a traction network. The parallel power supply method, in which the AT post is passed through the middle of a feeder and the section post is passed through the end thereof, is adopted (referring to FIG. 1 in details). The traction network of the method has the advantages of small impedance, the reduction for voltage loss of the traction network and the improvement for power supply quality. An indoor GIS inflatable switchgear is mainly adopted in 2×27.5 kV equipment of each post. Sometimes an indoor grid spacing location method is adopted in the equipment.

1. The Prior AT Post (1) Main Connection Lines of the Prior AT Post

FIG. 2 shows the main connection lines of the prior AT in details.

In the prior AT post, H1~H5 are GIS inflatable switchgears. AT1 and AT2 are autotransformers.

In the normal operation, a circuit breaker IDL in H1 and a disconnector 1G therein are closed. A circuit breaker 2DL in H2 and a disconnector 2G therein are closed. Parallel power supply in the middle of a feeder is realized through 1DL and 1G as well as 2DL and 2G by an upper/a down line traction network supplied with power by a first traction substation. When the upper/the down line traction network has fault, 1DL and 2DL have no a time-delay opening switch and the switch of a circuit breaker of feed lines of the traction substation is opened; therefore, the fault is cleared. After the fault is cleared, an auto-reclosing of the circuit breaker of the traction substation is initialized to be closed and supplies power to the traction network again. If the fault is not permanent, 1DL and 2DL are respectively detected to be the closing switch with voltage, and parallel power supply is recovered. If the fault is permanent, the switch is opened in acceleration behind the circuit breaker of feed lines of the traction substation, and then the fault circuit is cut. Meanwhile, 1DL and 2DL continue to be kept in opening state of the switch. After the fault circuit is recovered to be normal, the 1DL and 2DL are respectively closed and the parallel power supply is recovered.

A circuit breaker 3DL in H3, a disconnector 3G therein and an autotransformer AT1 therein as well as a circuit breaker 4DL in H4, a disconnector 4G therein and an autotransformer AT2 therein are blocked with each other. They can not be operated at the same time and are fixed backups with each other. In normal operation, the switches of 3D and 3G are closed, and AT1 is carried with current. When AT1 has fault, 3DL is opened; AT1 is out of service; a spare device is initialized; the switches of 4D and 4G are closed automatically, and AT2 is operated.

Therefore, when being in normal operation, the operation methods between H1 and H2 as well as H3 and H4 have no direct electric link. Actually, they can be divided into a parallel power supply unit consisting of 1DL, 1G, 2DL and 2G. An independent AT post consisting of 3DL, 3G, AT1, 4DL, 4G and AT2 functions as parallel power supply and the AT post. Therefore, the AT post can be regarded as an electric facility combined by a parallel power supply unit and an improved AT together. Hence, with actual construction demand and product manufacture, the parallel power supply unit is designed as a modularized electric apparatus which can be located beside a main line of railway, does not need special area, is located at the same longitudinal axis of a strut of a contact network and meets side clearance requirements. The improved AT post is designed as an integrated electric apparatus with small occupation area, independence and commonality. The abovementioned apparatuses are all manufactured in factory, which can reduce on-site construction quantity, shortens construction period as well as save land resources and construction investment.

(2) The Location Method of the General Layout Plan of the Prior at Post

FIG. 3 shows the location method of the general layout plan of the prior AT post in details.

The prior AT post consists of the apparatuses in indoor and outdoor parts, wherein autotransformers AT1 and AT2 are located outdoors, other apparatuses are located indoors with the adoption switchgear method. A cable assess method is adopted for all of 27.5 kV inlet and outlet wire. In order to meet the location requirements of the apparatuses, the main manufacture houses, such as a high-voltage room, a secondary apparatus room (which is used for the location of an AC power supply panel and a DC power supply panel, an integrated automation system panel, a video monitor screen, etc.), a communication room, a tool room and so on, must be equipped. Meanwhile, as there are relatively many high-voltage cables of the inlet and outlet wires, a cable interlayer is needed to be arranged under the manufacture houses to meet the requirements of the laying of the cables. Although the AT post of this type have full functions, a field with the area of about 20×40 m² near the place at which the AT post is needed to be arranged must be selected according to the location requirements of all of the apparatuses and the manufacture houses, which results in the increase of difficulty of site selection. Meanwhile, relatively much investment in the manufacture houses and 27.5 kV connection cables among four-circle 27.5 kV cable inlet and outlet wire, four-circle switchgear and the AT is also required.

2. The Prior Section Post (1) FIG. 4 shows the main connection lines of the prior section post in details.

When being in normal operation, a disconnector 11G in H1 and a disconnector 21G therein are opened. A circuit breaker 1DL in H11 and a disconnector 1G therein are closed. A circuit breaker 3DL in H3 and a disconnector 3G therein are closed. Parallel power supply at the terminal of the a feeder is realized through 1DL and 1G as well as 3DL and 3G by an upper and a down traction network of which power is supplied by a first traction substation. When the upper (or down) traction network has fault, 1DL and 3DL have no time-delay opening; A circuit breaker of feed lines of a traction substation is opened, and the fault is cleared. After the fault is cleared, an auto-reclosing of the circuit breaker of the feed line of the traction substation is initialized to be closed and supplies power to a traction network. If the fault is not permanent, 1DL and 3DL are respectively detected to be in voltage closing, and parallel power supply is recovered. If the fault is permanent, the switch is opened in acceleration behind the circuit breaker of feed lines of the traction substation, and then a fault circuit is cut. At this time, 1DL and 2DL continue to be kept in opening state and are respectively closed after a fault circuit is recovered and normal; hence parallel power supply is recovered. Similarly, 2DL and 2G in H2 as well as 4DL and 4G therein are closed. Parallel power supply at the end of a feeder is realized through 2DL and 2G as well as 4DL and 4G by an upper/a down traction network of which power is supplied by a second traction substation.

A circuit breaker 5DL in H5, a disconnector 5G therein and an autotransformer AT1 therein as well as a circuit breaker 7DL in H7, a disconnector 7G therein and an autotransformer AT2 therein are blocked with each other. They can not be operated at the same time and are fixed backups with each other. When being in normal operation, 5DL and 5G are closed, and AT1 is carried with current. When AT1 has fault, 5DL is opened; AT1 is out of service, a spare device is initialized; 7DL and 7G are automatically closed, and AT2 is put into operation. Similarly, AT3 and AT4 can not be put into operation at the same time and are fixed backups with each other.

When a first traction substation is out of service because of fault, a disconnector 11G in H1 and a disconnector 21G in H2 are closed. Over-zone power supply is offered to an upper and a down traction network of the first traction substation through 11G and 21G by a second traction substation. On the contrary, when the second traction substation has fault, over-zone power supply is also realized for the first traction substation through 11G and 21G.

Therefore, H1, H3, H5, H7, AT1 and AT2 as well as H2, H4, H6, H8, AT3 and AT4 are respectively formed into two of the prior AT posts. When being in normal operation, their operation methods have no direct electric link. Only when over-zone power supply is needed, they are linked together through disconnectores 11G and 21G to realize over-zone power supply function. Therefore, it can be regarded that the prior section post consists of two of the prior AT posts and an over-zone power supply disconnector.

Through the functional analysis for the prior section post and AT post, the prior section post can be regarded as one electric facility is assembled through guide lines by two independent parallel power supply units, two independent integration AT posts and two independent over-zone power supply units. Therefore, with the combination of actual construction demands and product manufacturing, the parallel power supply and the over-zone power supply unit are respectively designed as one independent modularized electric apparatus which can be located beside a main line of railway, does not need special area, and is located at the same longitudinal axis of a strut of a contact network and meets side clearance requirements. An integrated AT post is designed as an integrated electric apparatus with relatively small occupation area, independence and commonality. The integrated electric apparatus are mainly manufactured in the factory, which can reduce on-site construction quantity, shorten construction period, save land resources save construction investment.

(2) The Location Method of the General Layout Plan of the Prior Section Post

FIG. 5 shows the details of the location of the general layout plan of the prior section post in details.

The prior section post consists of indoor and outdoor apparatuses, wherein autotransformers AT1~AT4 are located outdoors. Other apparatuses are located indoors with the adoption of a switchgear method. A cable inlet and outlet method is adopted for all of 27.5 kV inlet and outlet wire. In order to meet the location requirements of the apparatuses, main manufacture houses, such as a high-voltage room, a secondary apparatus room (which is used for the location of an AC power supply panel and a DC power supply panel, an integrated automation system panel, a video monitor screen, etc.), must be equipped. At the same time, as there are relatively many the high-voltage cable of the inlet and outlet wires, a cable interlayer is arranged under the manufacture houses to meet the requirements of the laying of the cables. Although a section post of this type has full functions, a field with the area of about 30×40 m$^2$ near a bus station equipped with a neutral section insulator must be selected to meet the requirements of the location of the section post, which results in the increase of difficulty. At the same time, relatively much investment in the manufacture houses and 27.5 kV connection cables among eight-circle 27.5 kV cable inlet and outlet wire, an eight-circle switchgear and the AT is also required.

3. The Prior Traction Substation

FIG. 6 shows the main connection lines of the prior traction substation in details.

As for main apparatuses such as a 2×27.5 kV circuit breaker of the prior traction transformer, a voltage transformer, a current transformer and a disconnector, except the disconnector of feed lines and a thunder resistance circle which are located outdoors, others are located indoors with the adoption of a GIS inflatable switchgear and can meet the use requirements of products only when they are equipped with manufacture houses. A cable inlet and outlet method is adopted for all of high-voltage 27.5 kV inlet and outlet wire. As there are relatively many high-voltage cables of inlet and outlet wire, a cable interlay is needed to be arranged under the manufacture houses to meet the requirements of the laying of the cables. Although this location method has relatively high reliability of power supply, relatively much investment in land acquisition, manufacture houses, a GIS inflatable switchgear and a 27.5 kV cable is required.

4. The Current Manufacture Situation of 2×27.5 kV Apparatuses at Home and Abroad Currently, a GIS method that SF6 gas is filled in a 2×27.5 kV switchgear used in a traction substation, a section post and an AT post which are of an AT power supply method of a traction power supply system in the prior an electrified railway at home and abroad is mainly adopted. In order that the SF6 gas is prevented from escaping and polluting environment in use process, a large quantity of measures are taken in the manufacturing process of products, which results in very high manufacturing cost of the products and relatively huge construction investment. As for a 2×27.5 kV air-insulation switchgear, in order that the requirement of electrical safety distance is met, the outline dimension of the products becomes too big and a relatively big field and manufacture houses are needed. When an indoor grid spacing method is adopted, bigger field and bigger manufacture house are needed. Although apparatuses such as a 2×27.5 kV outdoor circuit breaker, a voltage transformer, a current transformer, a disconnector and so on are adopted too, a relatively big field is needed to meet the requirements of the installation and location of theses apparatuses when they are located outdoors as they are all single apparatuses. Furthermore, when a 2×27.5 kV outdoor independent element assembly type electric apparatus is adopted, although an outdoor location method is also adopted and house area and occupied area are decreased, the relatively big occupied area is still needed.

Therefore, a new autotransformer traction power supply system in an electrified railway is needed to replace the prior autotransformer traction power supply system in an electrified railway, wherein as for the new one, it consists of a traction substation, a parallel power supply unit, an integrated AT post, an over-zone power supply unit and a traction network; parallel power supply at the middle and the end of a feeder of an upper/a down traction network is realized through a parallel power supply unit, and over-zone power supply is realized through an over-zone power supply between two traction substations. As for the prior one, it consists of a traction substation, a section post, an AT post and a traction network, and parallel power supply is realized through the AT post at the middle of the feeder and through over-zone post at the terminal thereof. A 2×27.5 kV outdoor modularized electric apparatus is researched to meet the requirements of the new AT power supply. The prior AT section post is replaced to obtain the function of parallel power supply at the terminal of the feeder. The special area is not needed for the modularized electric apparatus, of which the installation place can be selected beside a main line of railway elastically to meet the location requirements of the outdoor traction substation. The product with the advantages of high reliability, free maintenance and miniaturization is a must. Furthermore, it is also a must to research a new integrated AT post which matches the parallel power supply unit and has the advantages of relatively small occupied area and high factory manufacture degree; furthermore, it does not need factory houses and can save land resources and the investment in cable lines. An integrated power box and a control box are used for a parallel power supply modularized electric apparatus and an over-zone power supply modularized electric apparatus. An outdoor preassembled protection measurement and control cabinet is used for an integrated AT post. An outdoor preassembled protection measurement and control cabinet is used for a traction substation. The outdoor location requirements of the modularized electric apparatus, the AT post and the traction substation must be met. The invention not only meets the requirement of safe and flexible power supplies of the AT traction power supply system in an electrified railway and that of unattended characteristics but also saves land resources, reduces the investment in factory houses and power supply lines, reduces on-site construction quantity and shortens construction period.

In the actual construction, according to the calculation requirement of traction power supply, a middle parallel power supply unit and an integrated AT post are arranged at appropriate places in the middle of a feeder; a neutral section insulator, a terminal parallel power supply unit and an integrated AT post as well as an over-zone power supply unit are arranged at the best place of terminal voltage of the feeder. As the parallel power supply unit, the over-zone power supply unit and the integrated AT post are designed and manufactured according to standards, and when being in the construction design, the parallel power supply unit and the over-zone power supply unit can be regarded as one switch apparatus in a traction network, and the integrated AT post can be regarded as one switch apparatus of the traction substation, which does not need independent design but only needs to determine their concrete installation sites; therefore, the invention has the advantages of reducing design quantity, shortening design period and increasing construction progress.

THE SUMMARY OF THE INVENTION

In order to overcome the disadvantages of the large occupied land, high investment cost and trouble maintenance of an AT power supply method of the prior traction power supply system in an electrified railway, the invention provides a modularized electric apparatus which does need special area, inlet and outlet wire corridors and power supply wires, factory houses and roads as well as are used for parallel power supply and over-zone power supply. The new autotransformer (AT) traction power supply system in an electrified railway equipped with a 2×27.5 kV outdoor modularized electric apparatus has the advantages of reducing the area occupied by an AT post and a traction substation, lowering the investment cost, having high reliability and having free maintenance.

The technical proposals adopted to solve the technical problems in the invention are as follows:

A new autotransformer (AT) traction power supply system equipped with a 2×27.5 kV outdoor modularized electric apparatus in an electrified railway comprises a traction substation located at the sidings of an electrified railway, wherein the output side of the traction substation is connected with an upper/a down line traction network. The upper/the down line traction network comprises a contact suspension T wire and a positive feed line F wire. A parallel apparatus which functions as parallel power supply is located at the middle and the end of a feeder of the upper/down line traction network. An over-zone apparatus, which functions as over-zone power supply, is located at a neutral section insulator between the feeders of the upper down line traction network of two adjacent traction substations. The parallel apparatus is connected with an AT apparatus which comprises a first parallel power supply unit, a second parallel power supply unit, a third parallel power supply unit and a fourth parallel power supply unit. The over-zone apparatus comprises a first over-zone power supply unit and a second over-zone power supply. The AT apparatus is a first integrated AT post, a second integrated AT post, a third integrated AT post and a fourth integrated AT post. The parallel power supply unit is connected with the first integrated AT post. The second parallel power supply unit is connected with the second integrated AT post. The third parallel power supply unit is connected with the third integrated AT post. The fourth parallel power supply unit is connected with the fourth integrated AT post.

The first parallel power supply unit, the second parallel power supply unit, the third parallel power supply unit and the fourth parallel power supply unit are the modularized electric apparatus used for parallel power supply, which comprises a first upper line input terminal, a second upper line input terminal, a first down line input terminal and a second down line input terminal. The first upper line input terminal and the second upper line input terminal are respectively connected with the T wire and F wire of the upper line traction network. The first down line input terminal and the second down line input terminal are connected with the T wire and F wire of the down line traction network.

The modularized electric apparatus used for the parallel power supply comprises a support, a first parallel upper line circuit branch arranged on the support, a first parallel down line circuit branch, a second parallel upper line circuit branch, a second parallel down line circuit branch, a parallel power supply control box and a parallel power supply power box, wherein the first parallel upper line circuit branch and the first parallel down line circuit branch are in connection in series, and the second parallel upper line circuit branch and the second parallel down line circuit branch are in connection in series.

The first parallel upper line circuit branch comprises a first parallel power-supply upper-line disconnector, a first parallel power-supply upper-line current transformer, a first parallel power-supply upper-line circuit breaker, a first parallel power-supply upper-line miniature transformer and a first parallel power-supply upper-line fuse protector thereof, wherein the first parallel power-supply upper-line disconnector, the first parallel power-supply upper-line current transformer and the first parallel power-supply upper-line circuit breaker are in connection in series. The first parallel power-supply upper-line miniature transformer and the first parallel power-supply upper-line fuse protector are in connection in series. The input terminal of the first upper line fuse protector is connected with a first upper line input terminal of the parallel power supply modularized electric apparatus.

The first parallel down line circuit branch comprises a first parallel power-supply down-line disconnector, a first parallel power-supply down-line current transformer, a first parallel power-supply down-line circuit breaker, a first parallel power-supply down-line miniature transformer and the first parallel power-supply down-line fuse protector, wherein the first parallel power-supply down-line disconnector, the first parallel power-supply down-line current transformer and the first parallel power-supply down-line circuit breaker are in connection in series. The first parallel power-supply down-line miniature transformer and the first parallel power-supply down-line fuse protector are in connection in series. The input terminal of the first down line fuse protector is connected with the first down line input terminal of the parallel power supply modularized electric apparatus.

The second parallel upper line circuit branch comprises a second parallel power-supply upper-line disconnector, a second parallel power-supply upper-line current transformer, a second parallel power-supply upper-line circuit breaker, a second parallel power-supply upper-line voltage transformer and the second parallel power-supply upper-line fuse protector, wherein the second parallel power-supply upper-line disconnector, the second parallel power-supply upper-line current transformer and the second parallel power-supply upper-line circuit breaker are in connection in series. The second parallel power-supply upper-line voltage transformer and the second parallel power-supply upper-line fuse protector are in connection in series. The input terminal of the second upper line fuse protector is connected with a second upper line input terminal of the parallel power supply modularized electric apparatus.

The second parallel down line circuit branch comprises a second parallel power-supply down-line disconnector, a second parallel power-supply down-line current transformer, a second parallel power-supply down-line circuit breaker, a second parallel power-supply down-line voltage transformer and the second parallel power-supply down-line fuse protector, wherein the second parallel power-supply down-line disconnector, the second parallel power-supply down-line current transformer and the second parallel power-supply down-line circuit breaker are in connection in series. The second parallel power-supply down-line voltage transformer and the second parallel power-supply down-line fuse protector are in connection in series. The input terminal of the second down line fuse protector is connected with a second down line input terminal of the parallel power supply modularized electric apparatus.

Second input terminals of the first parallel power-supply upper-line current transformer, the first parallel power-supply down-line current transformer, the second parallel power-supply upper-line current transformer, the second parallel power-supply upper-line voltage transformer, the second parallel power-supply down-line current transformer and the second parallel power-supply down-line voltage transformer are all connected with the parallel power supply control box. The second input terminals of the first parallel power-supply upper-line miniature transformer and the first parallel power-supply down-line miniature transformer are connected with the parallel power-supply power box. The voltage detection signals of the first parallel upper line circuit branch of the parallel power-supply control box and the first parallel down-line circuit branch thereof are drawn down from the parallel power supply power box.

The connection nodes of the first parallel upper line circuit branch and the first parallel down line circuit branch are connected with the T input terminal of the integrated AT post corresponding to the parallel power supply unit. The connection nodes of the second parallel upper line circuit branch and the second parallel down line circuit branch are connected with F input terminal of the integrated AT post corresponding to the parallel power supply unit.

The integrated AT post comprises a first AT transformer, a second AT transformer and the modularized electric apparatus used for the AT post. The first input terminal T of the modularized electric apparatus used for the AT post and the second input terminal F thereof are connected with the T wire and F wire of the output terminal of the modularized electric apparatus used for the parallel power supply. The AT modularized electric apparatus used for the AT post is connected with the first AT transformer and the second AT transformer. The grounding terminals of the first AT transformer and the second AT transformer are connected with return wires and a grounding network. Firewalls are arranged between the first AT transformer and the second AT transformer.

The modularized electric apparatus used for the AT comprises the support, the first circuit branch arranged on the support, the first circuit branch of the F wire, the second circuit branch of the T wire, the second circuit branch of T wire and the second circuit branch of the F wire.

The first circuit branch of the T wire comprises the first circuit breaker of the T wire, the first current transformer thereof, the first disconnector thereof, the first miniature transformer thereof and the first fuse protector thereof. The first circuit breaker of the T wire, the first current transformer thereof and the first disconnector thereof are in connection in series. The first miniature transformer of the T wire and the first fuse protector thereof are in connection in series. The input terminal of the first fuse protector of the T wire is connected with the input terminal of the T wire. The output terminal of the first disconnector of the T wire is connected with the input terminal of the T wire of the first AT transformer.

The first circuit branch of the T wire comprises the first circuit breaker of the F wire, the first current transformer thereof, the first disconnector thereof, the first miniature transformer thereof and the first fuse protector thereof. The first circuit breaker of the T wire, the first current transformer thereof and the first disconnector thereof are in connection in series. The first miniature transformer of the T wire and the first fuse protector thereof are in connection in series. The input terminal of the first fuse protector of the F wire is connected with the input terminal of the F terminal. The output terminal of the first disconnector of the F wire is connected with the input terminal of the F wire of the first AT transformer.

The second circuit branch of the T wire comprises the second circuit breaker of the T wire, the second current transformer thereof and the second disconnector thereof. The second circuit breaker of the T wire, the second current transformer thereof and the second disconnector thereof are in connection in series. The input terminal of the second circuit breaker of the T wire is connected with the input terminal of the T wire. The output terminal of the second disconnector of the T wire is connected with the input terminal of the T wire of the second AT transformer.

The second circuit branch of the F wire comprises the second circuit breaker of the F wire, the second current transformer of the T wire and the second disconnector of the F wire. The second circuit breaker of the F wire, the second current transformer thereof and the second disconnector thereof are in connection in series. The input terminal of the second circuit breaker of the F wire is connected with the input terminal of the F wire. The output terminal of the second disconnector of the F wire is connected with the input terminal of the F wire of the second AT transformer.

All of the second output terminals of the first current transformer of the T wire, the first miniature transformer the T wire, the first current transformer the F wire, the first miniature transformer of the F wire, the second current transformer of the T wire and the second current transformer of the F wire are connected with an outdoor preassembled protection measurement and control cabinet of the integrated AT post.

As for one preferable proposal, the first over-zone power supply unit and the second over-zone power supply unit are both the modularized electric apparatus used for over-zone power supply. The modularized electric apparatus used for the over-zone power supply comprises the first over-zone input terminal, the second over-zone input terminal, the first over-zone output terminal and the second over-zone output terminal. The modularized electric apparatus used for the over-zone power supply comprises the support, the first over-zone circuit branch arranged on the support, the second over-zone circuit branch, the over-zone control box and the over-zone power box.

The first over-zone circuit branch comprises the first over-zone left-side disconnector, the first over-zone circuit breaker, the first over-zone current transformer, the first over-zone right-side disconnector, the first over-zone left-side miniature transformer and the first over-zone left-side fuse protector, the first over-zone right-side miniature transformer and the first over-zone right-side fuse protector, wherein the first over-zone left-side disconnector, the first over-zone circuit, breaker, the first over-zone current transform and the first over-zone right-side disconnector are in connection in series. The first over-zone left-side miniature transformer and the first over-zone left-side fuse protector are in connection in series. The input terminal of the first over-zone left-side fuse protector is connected with the first over-zone input terminal. The first over-zone left-side miniature transformer and the first over-zone left-side fuse protector are in connection in series. The input terminal of the first over-zone right-side fuse protector is connected with the first over-zone output terminal.

The second over-zone circuit branch comprises the second over-zone left-side disconnector, the second over-zone circuit breaker, the second over-zone current transformer, the second over-zone right-side disconnector, the second over-zone left-side voltage transformer, the second over-zone left-side fuse protector, the second over-zone right-side voltage transformer and the second over-zone right-side fuse protector. The second over-zone left-side disconnector, the second over-zone circuit breaker, the second over-zone current transformer and the second over-zone right-side disconnector are in connection in series.

The second over-zone left-side voltage transformer and the second over-zone left-side fuse protector are in connection in series. The input terminal of the second over-zone left-side fuse protector is connected with the second over-zone input terminal. The second over-zone right-side voltage transformer and the second over-zone right-side fuse protector are in connection in series. The input terminal of the second over-zone right-side fuse protector is connected with the second over-zone output terminal.

The second output terminals of the first over-zone current transformer, the second over-zone current transformer, the second over-zone left-side voltage transformer and the second over-zone right-side voltage transformer are connected with the over-zone control box. The second output terminals of the first over-zone left-side miniature transformer and the first over-zone right-side miniature transformer are connected with the over-zone power box. The voltage detection signals of the left and the right sides of the first over-zone circuit branch of the over-zone control box are drawn down from the over-zone power box.

The 2×27.5 kV side of the traction transformer of the traction substation and the output terminals of the upper/down line feed lines are all the modularized electric apparatuses used for output. The modularized electric apparatus used for output comprises the support, the output circuit breaker arranged on the support, the output current transformer and the output disconnector. The modularized electric apparatus used for output comprises two input terminals of the T wire and the F wire as well as two output terminals of the T wire and the F wire. The modularized electric apparatus used for output comprises two output circuit branches. Each of the output circuit branches is the output circuit breaker, the output current transformer and the output disconnector which are in connection in series. Two input terminals of the modularized electric apparatus used for output at the 2×27.5 kV side of the traction transformer are respectively connected with the T wire output terminal of the traction transformer and the F wire output terminal thereof. The two output terminals of the modularized electric apparatus used for output at the 2×27.5 kV side of the traction conformer are respectively connected with an outdoor T bus of the traction substation and an outdoor F bus thereof. Two input terminals of the modularized electric apparatus used for output at the upper/down line feed line are respectively connected with the outdoor T bus of the traction substation and the outdoor F bus thereof. Two of output terminals of the modularized electric apparatus used for output at the upper/down line feed line are respectively connected with the T wire input terminal of the upper/down line feed line thunder resistance circle and the F wire input terminal thereof. The backup contact disconnector is arranged between two modularized electric apparatuses used for output at the upper/down line feed line.

The second output terminal of the output current transformer is connected with the outdoor preassembled protection measurement and control cabinet of the traction substation.

In the first step, as for the modularized electric apparatus used for parallel power supply, the modularized electric apparatus used for the AT post, the modularized electric apparatus used for over zone and the modularized electric apparatus used for traction substation, all of their circuit components are fixed, sealed and combined together with epoxy resin.

As for the modularized electric apparatus used for parallel power supply and the control box of the modularized electric apparatus used for over zone, their second apparatuses of control, protection, telecontrol and telecommunication are integrated together. As for the modularized electric apparatus used for the parallel power supply and the power box of the modularized electric apparatus used for over zone, their second apparatuses of AC and DC auxiliary power are integrated together.

The second apparatuses, such as the comprehensive automation system of the integrated AT post, AC and DC auxiliary power systems, the telecontrol, the telecommunication and so on, are integrated together.

The second apparatuses, such as the comprehensive automation system of the traction substation, AC and DC auxiliary power systems, the telecontrol, the telecommunication and so on, are integrated together.

The technical design of the invention is as follows: the prior AT traction power supply system in an electrified railway is replaced with the new AT traction power supply system in an electrified railway, wherein as for the new one, it consists of the traction substation, the parallel power supply unit, the integrated AT post, the over-zone power supply unit and the traction network. As for the prior one, it consists of the traction substation, the section post, the AT post and the traction network; the parallel power supply is realized through the AT post in the middle of the feeder of the upper/down line traction network and through the section post at the terminal thereof.

A 2×27.5 kV outdoor modularized electric apparatus is researched to replace the prior AT post and section post, wherein the parallel power supply functions of the AT post of the AT traction power supply system in an electrified railway and the section post thereof can be fulfilled by the outdoor modularized electric apparatus. However, special area is not needed for the modularized electric apparatus. Its installation site can be selected flexibly beside the main line of railway. It is located at the same longitudinal axis of a strut of a contact network, which can meet side clearance requirement, have characteristics of high reliability, free maintenance and miniaturization as well as save land resources, factory houses and the investment in inlet (outlet) line corridor and power supply lines.

An integrated AT post is researched to replace the traditional AT post and the section post, wherein the functions of the prior AT post can be fulfilled by the integrated AT post. The integrated AT post has the advantages of small occupied area and high factory manufacturing degree, wherein its factory houses are not needed; unattended requirement can be met; its on-site construction quantity can be reduced; its construction period is shortened; the 2×27.5 kV outdoor modularized electric apparatus and autotransformer are adopted; the outdoor modularized electric apparatus is combined with the outdoor preassembled protection measurement and control cabinet, with the advantages of novel main-connection-line structure, overall outdoor arrangement and commonality.

When the 2×27.5 kV outdoor modularized electric apparatus is applied for the traction substation, the requirement of overall outdoor arrangement of the traction substation can be met, which not only can reduce the occupied area of the traction substation, eliminate factory houses, reduce the investment in the inlet and outlet wire of cables but also can meet the safe power supply requirement, reduce on-site construction quantity and shorten construction period.

When the 2×27.5 kV outdoor modularized electric apparatus is applied for over-zone power supply, it can be located beside the main line of railway near the neutral section insulator. The over-zone power supply disconnector can be replaced by the modularized electric apparatus. Over-zone power supply function can be realized. Special area is not needed, which saves land resources; furthermore, as the modularized electric apparatus has the capacity to break short circuit current, the reliability of the over-zone power supply can be increased.

An outdoor power box and a control box, which are the secondary apparatuses matching the 2×27.5 kV outdoor modularized electric apparatus, are researched to integrate control, protection, AC and DC auxiliary power, telecommunication and telecontrol as a whole. The outdoor power box and the control box are used for parallel power supply unit and over-zone power supply unit and meet the application needs of the 2×27.5 kV outdoor modularized electric apparatus.

An AT post outdoor preassembled protection measurement and control cabinet, which is the secondary apparatus matching the 2×27.5 kV outdoor modularized electric apparatus, is researched to integrate the AT comprehensive automation system, AC and DO auxiliary power, telecommunication and telecontrol as a whole. The cabinet is used for the parallel power supply unit and the over-zone power supply unit and meets the application need of the 2×27.5 kV outdoor modularized electric apparatus.

A traction substation outdoor preassembled protection measurement and control cabinet, which is the secondary apparatus matching the traction substation 110 kV (or 220 kV) apparatus and the 2×27.5 kV outdoor modularized electric apparatus, is researched to integrate the comprehensive automation system of the traction substation, the AC and DC auxiliary power system, telecontrol and telecommunication as a whole, be used for the traction substation, and meet the overall outdoor arrangement requirement when the 2×27.5 kV outdoor modularized electric apparatus is applied by the traction substation.

The 2×27.5 kV outdoor modularized electric apparatus comprises the 2×27.5 kV outdoor circuit breaker, the current transformer, the disconnector, the miniature transformer (or the voltage transformer), as well as a support work and an operational mechanism which match the modularized electric apparatus, which meets the outdoor electric safe distance requirement.

The integrated AT post comprises the 2×27.5 kV outdoor modularized electric apparatus, the autotransformer, outdoor box preassembled protection measurement and control cabinet, the support work matching the integrated AT post and openable steel structure fence walls with firewall function, which can meet the requirements of the outdoor electric safe distance, telecontrol and comprehensive automation.

The invention has the following advantages: the prior section post and the AT post are replaced with the invention; furthermore, the special area, an inlet (outlet) line corridor and power supply lines, the factory houses and roads are needed for the modularized electric apparatus used for the parallel power supply and the modularized electric apparatus used for over-zone power supply. The integrated AT post and the traction substation have the advantages of reducing the occupied area, no need of the factory houses, lowering the investment cost, high reliability, free maintenance, high factory manufacturing degree and short construction period.

THE DRAWINGS OF THE INVENTION

THE EMBODIMENTS OF THE INVENTION

Figure 1:
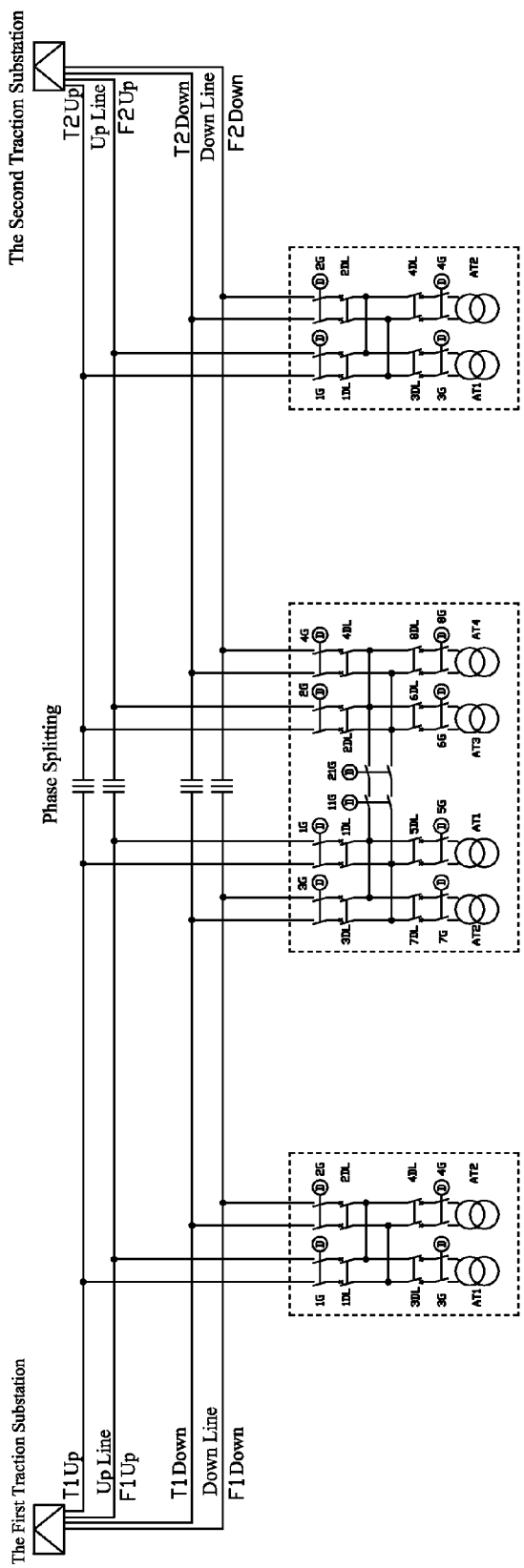
FIG. 1 shows a parallel power supply schematic diagram that an AT post is passed through in the middle of a feeder of an upper/a down line traction network of the prior traction power supply system in an electrified railway and a section post is passed through at the terminal thereof.
Figure 2:
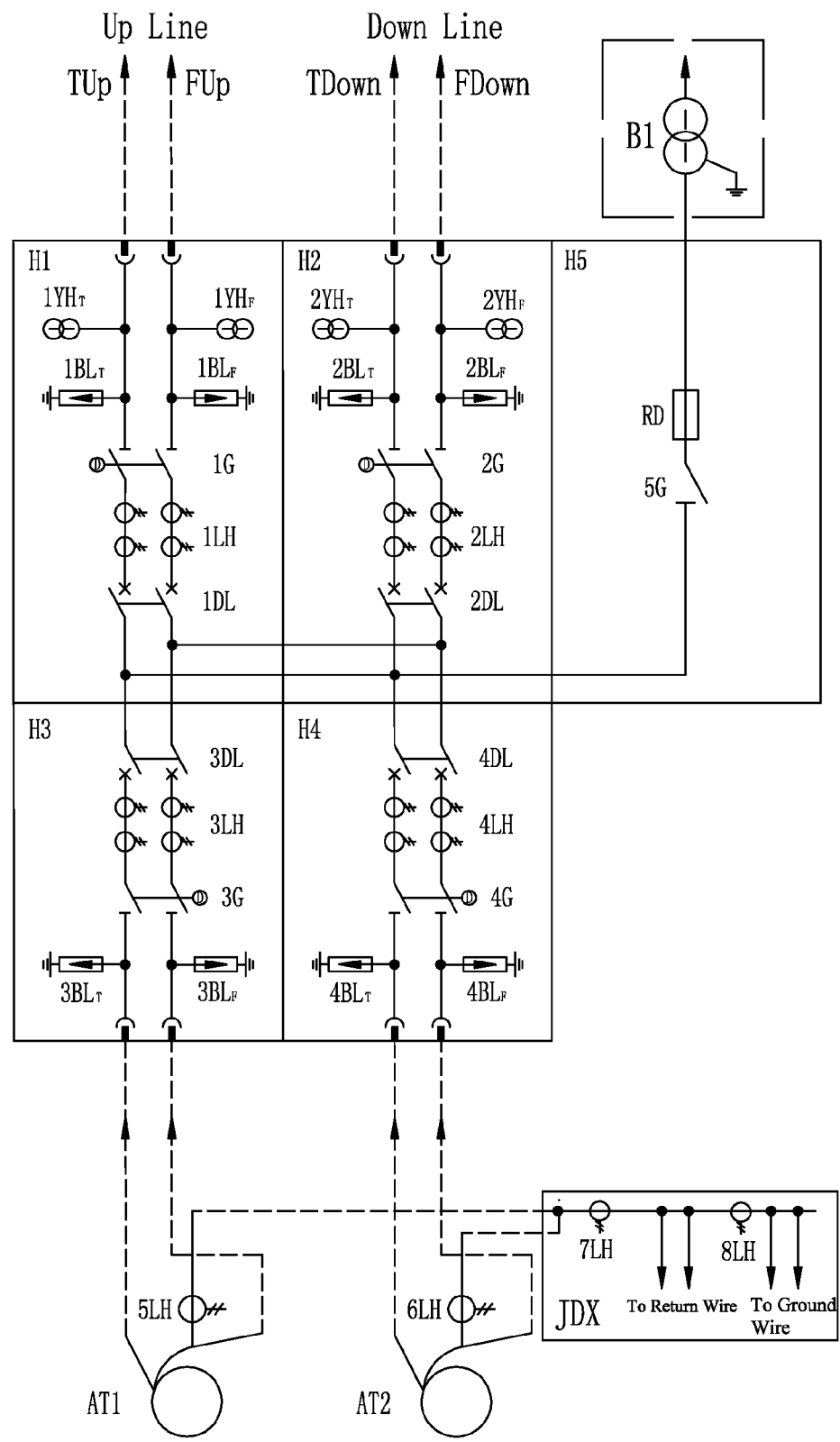
FIG. 2 shows a main connection line of the prior AT traction power supply system in an electrified railway.
Figure 3:
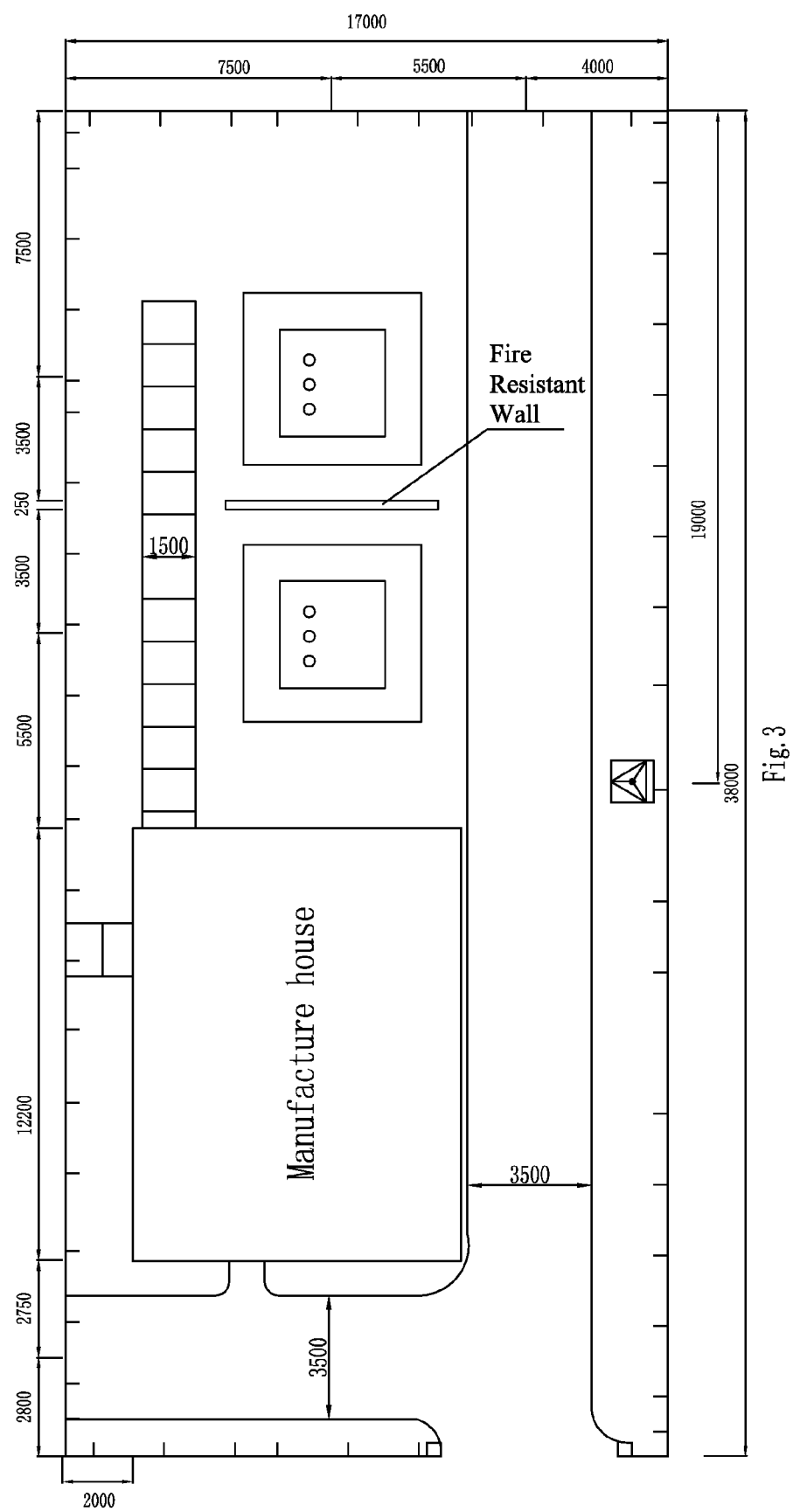
FIG. 3 shows a general arrangement plan of the AT post of the prior AT traction power supply system in an electrified railway (unit: mm).
Figure 4:
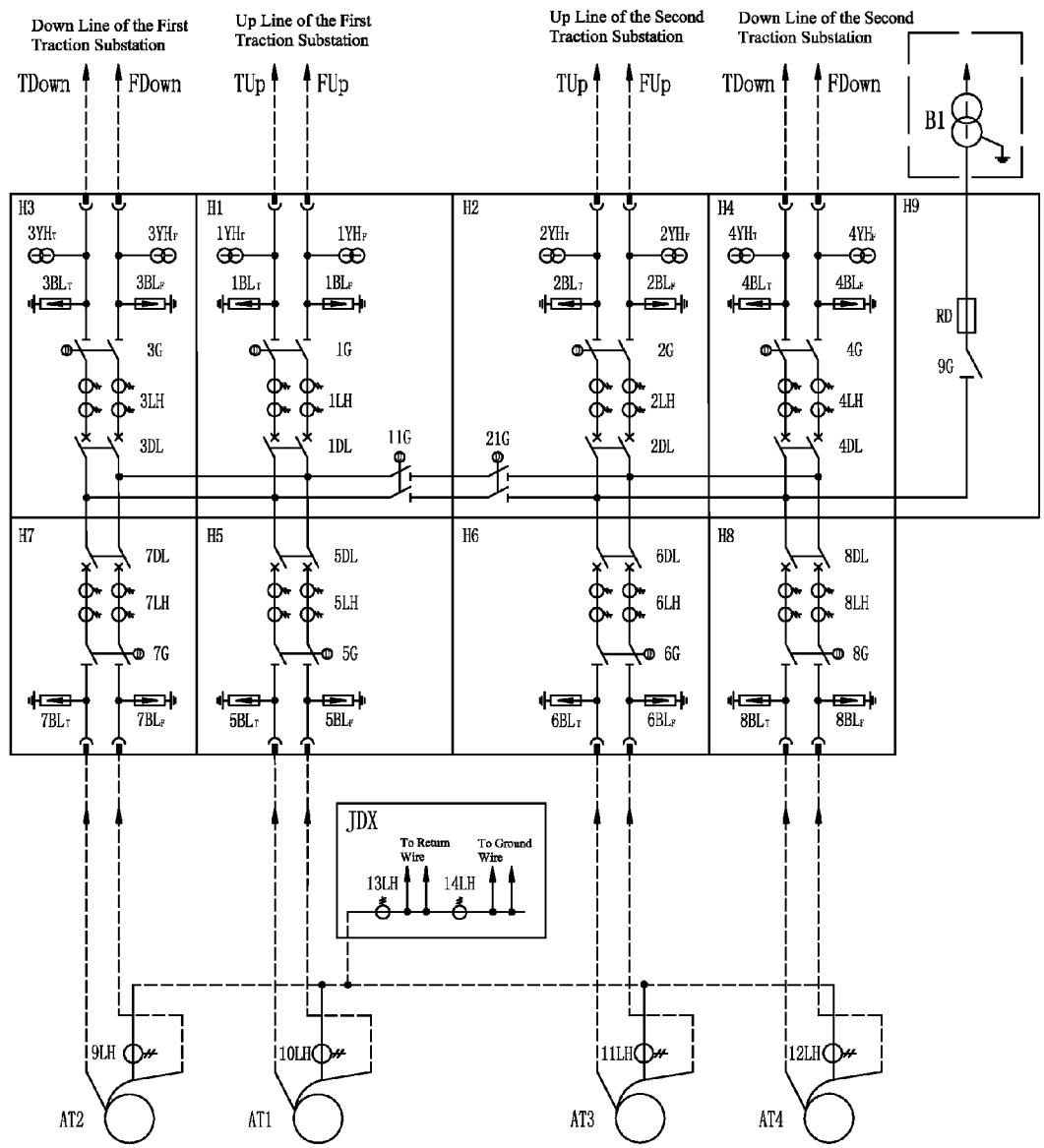
FIG. 4 shows a main connection line of a section post of the prior AT traction power supply system in an electrified railway.
Figure 5:
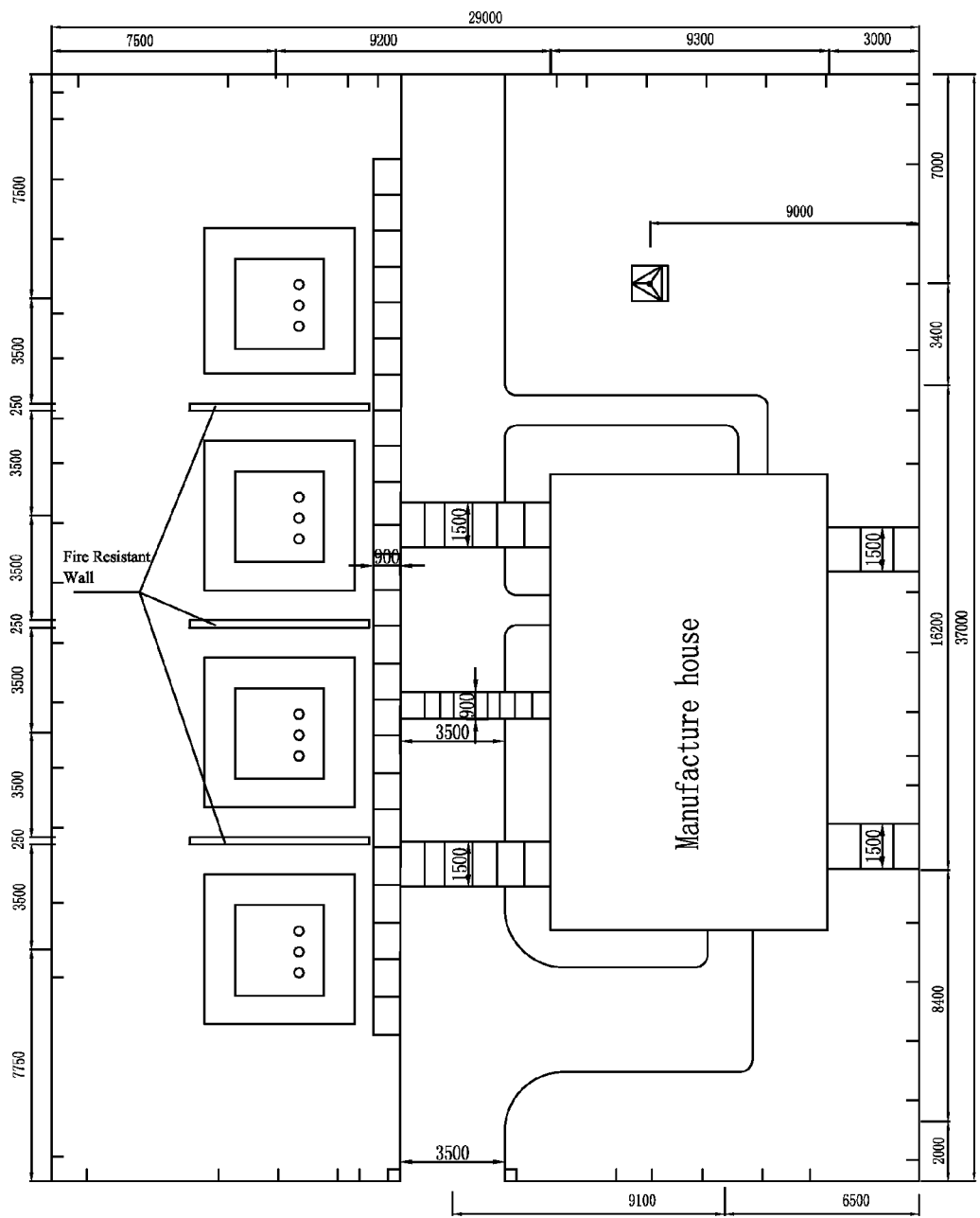
FIG. 5 shows a general arrangement plan of a section post of the prior AT traction power supply system in an electrified railway (unit: mm).
Figure 6:
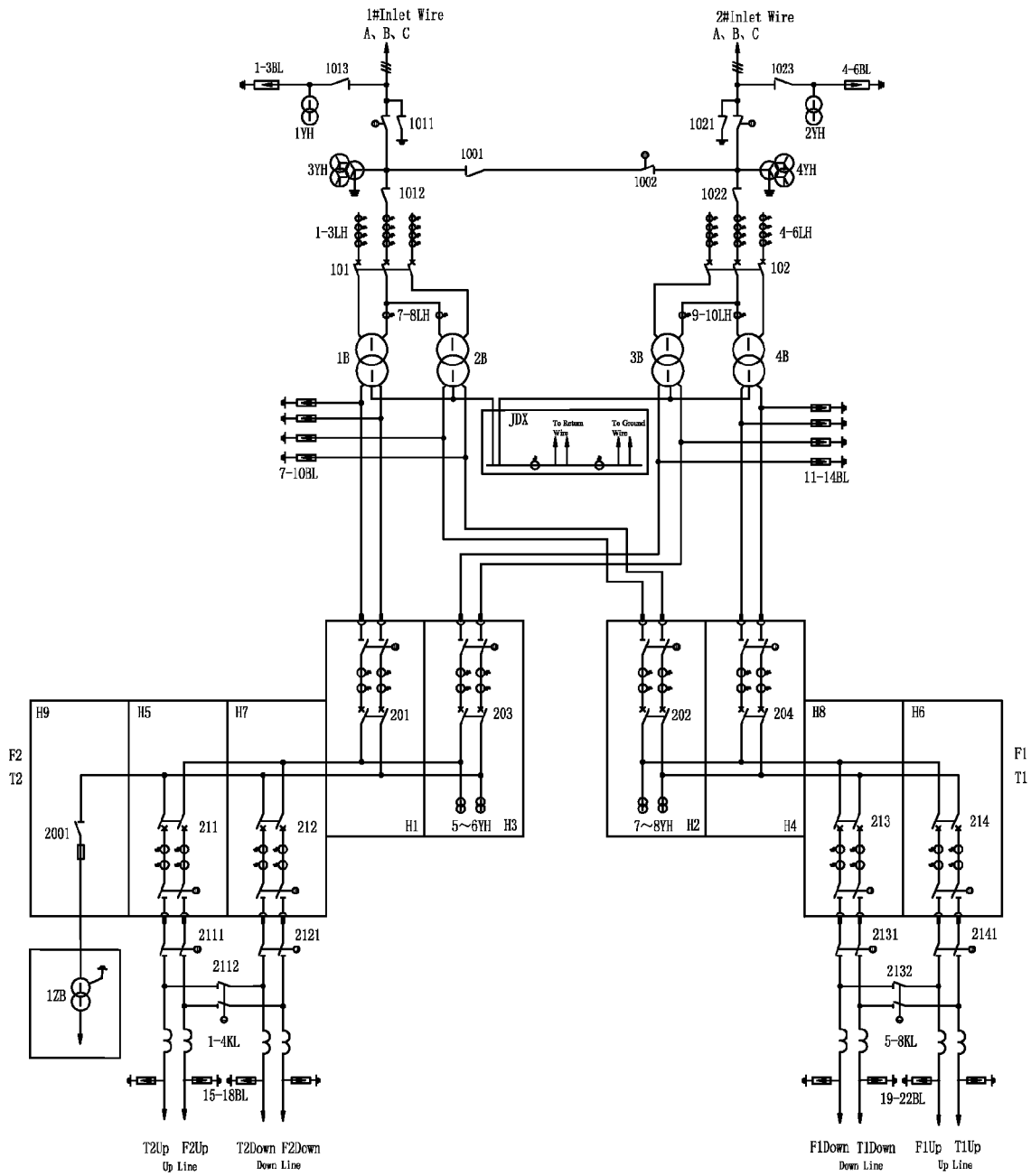
FIG. 6 shows a main connection line of a traction substation of the prior AT power supply system in an electrified railway.

The invention is further described with the drawings in the following:

Refer to FIGS. 7-16, a new autotransformer (AT) traction power supply system equipped with a 2×27.5 kV outdoor modularized electric apparatus in an electrified railway comprises a traction substation located beside an electrified railway. The output terminal of the traction substation is connected with an upper/a down line traction network. The upper/down line traction network respectively comprises a contact suspension T wire and a positive feed line F wire. A parallel apparatus with parallel power supply function is located in the middle and the end of a feeder of the upper/down line traction network of two adjacent traction substations. An over-zone apparatus with over-zone power supply function is arranged at a neutral section insulator between the feeders of the up/down line traction network of two adjacent traction substations. The parallel apparatus is connected with an AT apparatus. The parallel apparatus comprises a first parallel power supply unit, a second parallel power supply unit, a third parallel power supply unit and a fourth parallel power supply unit. The over-zone apparatus comprises a first over-zone power supply unit, a second over-zone power supply unit. The AT apparatus is a first integrated AT post, a second integrated AT post, a third integrated AT post and a fourth integrated AT post. The first power supply power supply unit is connected with the first integrated AT post. The second parallel power supply unit is connected with the second integrated AT post. The third parallel power supply unit is connected with the third integrated AT post. The fourth parallel power supply unit is connected with the fourth integrated AT post.

The first parallel power supply unit, the second parallel power supply unit, the third parallel power supply unit and the fourth power supply unit are a modularized electric apparatus used for parallel power supply. The modularized electric apparatus used for parallel power supply comprises a first upper line input terminal, a second upper line input terminal, a first down line input terminal and a second down line input terminal. The first upper line input terminal and the second upper line input terminal are respectively connected with the T wire of an upper traction network and the F wire thereof. The first down line input terminal and the second down line input terminal are connected with the T wire of the down line traction network and the F wire thereof.

The modularized electric apparatus used for the parallel power supply comprise a support, a first parallel upper line circuit branch arranged on the support, a first parallel down line circuit branch, a second parallel upper line circuit branch, a second parallel down line circuit branch, a parallel power supply control box and a parallel power supply power box. The first parallel upper line circuit branch and the first parallel down line circuit branch are in connection in series. The second parallel upper line circuit branch and the second parallel down line circuit branch are in connection in series.

The first parallel upper line circuit branch comprises a first parallel power-supply upper-line disconnector, a first parallel power-supply upper-line current transformer, a first parallel power-supply upper-line circuit breaker, a first parallel power-supply upper-line miniature transformer and a first parallel power-supply upper-line fuse protector. The first parallel power-supply upper-line disconnector, the first parallel power-supply upper-line current transformer and the first parallel power-supply upper-line circuit breaker are in connection in series. The first parallel power-supply upper-line miniature transformer and the first parallel power-supply upper-line fuse protector are in connection in series. The input terminal of the first upper line fuse breaker is connected with the first upper-line input terminal of the modularized electric apparatus used for parallel power-supply.

The first parallel down line circuit branch comprises the first parallel power-supply down-line disconnector, the first parallel power-supply down-line current transformer, the first parallel power-supply down-line circuit breaker, the first parallel power-supply down-line miniature transformer and the first parallel power-supply down-line fuse protector. The first parallel power-supply down-line disconnector, the first parallel power-supply down-line current transformer and the first parallel down line circuit breaker are in connection in series. The first parallel power-supply down-line miniature transformer and the first parallel power-supply down-line fuse protector are in connection in series. The input terminal of the first down line fuse protector is connected with the first down line input terminal of the modularized electric apparatus used for parallel power supply.

The second parallel upper-line circuit branch comprises a second parallel power-supply upper-line disconnector, a second parallel power-supply upper-line current transformer, a second parallel power-supply upper-line circuit breaker, a second parallel power-supply upper-line voltage transformer and a second parallel power-supply upper-line fuse protector. The second parallel power-supply upper-line disconnector, the second parallel power-supply upper-line current transformer and the second parallel power-supply upper-line fuse protector are in connection in series. The second parallel power-supply upper-line voltage transformer and the second parallel power-supply upper-line are in connection in series. The input terminal of the second upper line fuse protector is connected with the second upper line input terminal of the modularized electric apparatus used for parallel power supply.

The second parallel down-line circuit branch comprises a second parallel power-supply down-line disconnector, a second parallel power-supply down-line current transformer, a second parallel power-supply down-line circuit breaker, a second parallel power-supply down-line voltage transformer and a second parallel power-supply down-line fuse protector. The second parallel power-supply down-line disconnector, the second parallel power-supply down-line current transformer and the second parallel power-supply down-line fuse protector are in connection in series. The second parallel power-supply down-line voltage transformer and the second parallel power-supply down-line are in connection in series. The input terminal of the second down line fuse protector is connected with the second down line input terminal of the modularized electric apparatus used for parallel power supply.

All of the second output terminals of the first parallel power-supply upper-line current transformer, the first parallel power-supply down-line current transformer, the second parallel power-supply upper-line current transformer, the second parallel power-supply upper-line voltage transformer, the second power-supply parallel-line current transformer and the second parallel power-supply down-line voltage transformer are connected with the parallel power-supply control box. The second output terminals of the first parallel power-supply upper-line miniature transformer and the first parallel power-supply down-line miniature transformer are connected with the parallel power-supply power box. The voltage detection signals of the first parallel upper line circuit breaker of the parallel power supply control and the first parallel down line circuit branch thereof are drawn down from the parallel power supply power box.

The connection node of the first parallel upper line circuit branch and the first parallel down line is connected with the T input terminal of the integrated AT post corresponding to the parallel power supply unit. The connection node of the second parallel upper line circuit branch and the second parallel down line circuit branch is connected with the input terminal of the F terminal of the integrated AT post corresponding to the parallel power supply unit.

The integrated AT post comprises a first AT transformer, a second AT transformer and the modularized electric apparatus used for the AT post. The first input terminal T of the modularized electric apparatus used for the AT post and the second input terminal F thereof are connected with the T wire of the output terminal of the modularized electric apparatus used for the parallel power supply and the F wire thereof. The modularized electric apparatus used for the AT post is connected with the first AT transformer and the second AT transformer. The grounding terminals of the first AT transformer and the second AT transformer are connected with return wires and a grounding network. Firewalls are arranged between the first AT transformer and the second AT transformer.

The modularized electric apparatus used for the AT post comprises the support, the first circuit branch of the T wire arranged on the support, the first circuit branch of the F wire arranged on the support, the second circuit branch of the T wire arranged on the support and the second circuit branch of the F wire arranged on the support.

The first circuit branch of the T wire comprises the first circuit breaker of the T wire, the first disconnector thereof, the first miniature transformer thereof and the first fuse protector thereof. The first circuit breaker of the T wire, the first current transformer thereof and the first disconnector thereof are in connection in series. The first miniature transformer of the T wire and the first fuse protector thereof are in connection in series. The input terminal of the first fuse protector of the T wire is connected with the input terminal of the T wire. The output terminal of the first disconnector of the T wire is connected with the input terminal of the T wire of the first AT transformer.

The first circuit branch of the F wire comprises the first circuit breaker of the F wire, the first current transformer thereof, the first disconnector thereof, the first miniature transformer thereof and the first fuse protector thereof. The first circuit breaker of the F wire, the first current transformer thereof and the first disconnector thereof are in connection in series. The first miniature transformer of the F wire and the first fuse protector thereof are in connection in series. The input terminal of the first fuse protector of the F wire is connected with the input terminal of the F wire. The input terminal of the first disconnector of the F wire is connected with the input terminal of the F wire of the first AT transformer.

The second circuit branch of the T wire comprises the second circuit breaker of the T wire, the second current transformer thereof and the second disconnector thereof. The second circuit breaker of the T wire, the second current transformer thereof and the second disconnector thereof are in connection in series. The input terminal of the second circuit breaker of the T wire is connected with the input terminal of the T wire. The output terminal of the second disconnector of the T wire is connected with the input terminal of the T wire of the second AT transformer.

The second circuit branch of the F wire comprises the second circuit breaker of the F wire, the second current transformer thereof and the second disconnector thereof. The second circuit breaker of the F wire, the second current transformer thereof and the second disconnector thereof are in connection in series. The input terminal of the second circuit breaker of the F wire is connected with the input terminal of the F wire. The output terminal of the second disconnector of the F wire is connected with the input terminal of the F wire of the second AT transformer.

All of the second output terminals of the first current transformer of the T wire, the first miniature transformer of the T wire, the first current transformer of the F wire, the first miniature transformer of the F wire, the second current transformer of the T wire and the second current transformer of the F wire are connected with the outdoor preassembled protection measurement and control cabinet of the integrated AT post.

The first over-zone power supply unit and the second over-zone power supply unit are both the modularized electric apparatus used for the over-zone power supply. The modularized electric apparatus used for the over-zone power supply comprises the first over-zone input terminal, the second over-zone input terminal, the first over-zone output terminal and the second over-zone output terminal. The modularized electric apparatus used for the over-zone power supply comprises the support, the first over-zone circuit branch arranged on the support, the second over-zone circuit branch, the over-zone control box and the over-zone power box.

The first over-zone circuit branch comprises the first left-side disconnector, the first over-zone circuit breaker, the first over-zone current transformer, the first over-zone right-side disconnector, the first over-zone left-side miniature transformer, the first over-zone left-side fuse protector, the first over-zone right-side miniature transformer and the first over-zone right-side fuse protector. The first over-zone left-side disconnector, the first over-zone circuit breaker, the first over-zone current transformer and the first over-zone right-side disconnector are in connection in series. The first over-zone left-side miniature transformer and the first over-zone left-side fuse protector are in connection in series. The input terminal of the over-zone left-side fuse protector is connected with the first input terminal. The first over-zone right-side miniature transformer and the first over-zone right-side fuse protector are in connection in series. The input terminal of the first over-zone right-side fuse protector is connected with the first over-zone output terminal.

The second over-zone circuit branch comprises the second over-zone left-side disconnector, the second over-zone circuit breaker, the second over-zone current transformer, the second over-zone right-side disconnector, the second over-zone left-side voltage transformer, the second over-zone left-side fuse protector, the second over-zone right-side voltage transformer and the second over-zone right-side fuse protector. The second over-zone left-side disconnector, the second over-zone circuit breaker, the second over-zone current transformer and the second over-zone right-side disconnector are in connection in series. The second over-zone left-side voltage transformer and the second over-zone left-side fuse protector are in connection in series. The input terminal of the second over-zone left-side fuse protector is connected with the second over-zone input terminal. The second over-zone right-side voltage transformer and the second over-zone right-side are in connection in series. The input terminal of the second over-zone right-side fuse protector is connected with the second over-zone output terminal.

All of the second output terminals of the first over-zone current transformer, the second over-zone current transformer, the second over-zone left-side voltage transformer and the second over-zone right-side voltage transformer are connected with the over-zone control box. The second output terminals of the first over-zone left-side miniature transformer and the first over-zone right-side miniature transform are connected with the over-zone power box. The voltage detection signals of the left and the right sides of the first over-zone circuit branch of the over-zone control box are drawn down from the over-zone power box.

The 2×27.5 kV side of the traction transformer of the traction substation and the output side of the upper/down line teed line are both the modularized electric apparatus used for output. The modularized electric apparatus used for output comprises the support, the output circuit breaker arranged on the support, the output current transformer and the output disconnector. The modularized electric apparatus used for output comprises two input terminals of the T wire and the F wire as well as two output terminals of the T wire and the F wire. The modularized electric apparatus used for the output comprises two output circuit branches. Each output circuit branch is the output circuit breaker, the output current transformer and the output disconnector which are in connection in series. Two input terminals of the modularized electric apparatus used for the output at the 2×27.5 kV side of the traction transformer are respectively connected with the output terminals or the T wire and the F wire of the traction substation. The two output terminals of the modularized electric apparatus used for output at the 2×27.5 kV side of traction transformer are respectively connected with the outdoor T bus and the outdoor F bus of the traction substation. Two input terminals of the modularized electric apparatus used for output at the upper/down line feed line are respectively connected with the input terminals of the outdoor T bus and the outdoor F bus of the traction substation. The two output terminals of the modularized electric apparatus used for output at the upper/down line feed line are respectively connected with the input terminals of T wire and the F wire of a thunder resistance circle at the upper/down line feed line. The backup contact disconnector is arranged between two modularized electric apparatuses used for output at the upper/down line feed line.

The second output terminal of the output current transformer is connected with the outdoor preassembled protection measurement and control cabinet of the traction substation.

As for the modularized electric apparatus used for parallel power supply, the modularized electric apparatus used for the AT post, the modularized electric apparatus used for over zone and the modularized electric apparatus used for traction substation, all of the elements of the circuits are fixed, sealed and combined together with epoxy resin.

Figure 10:
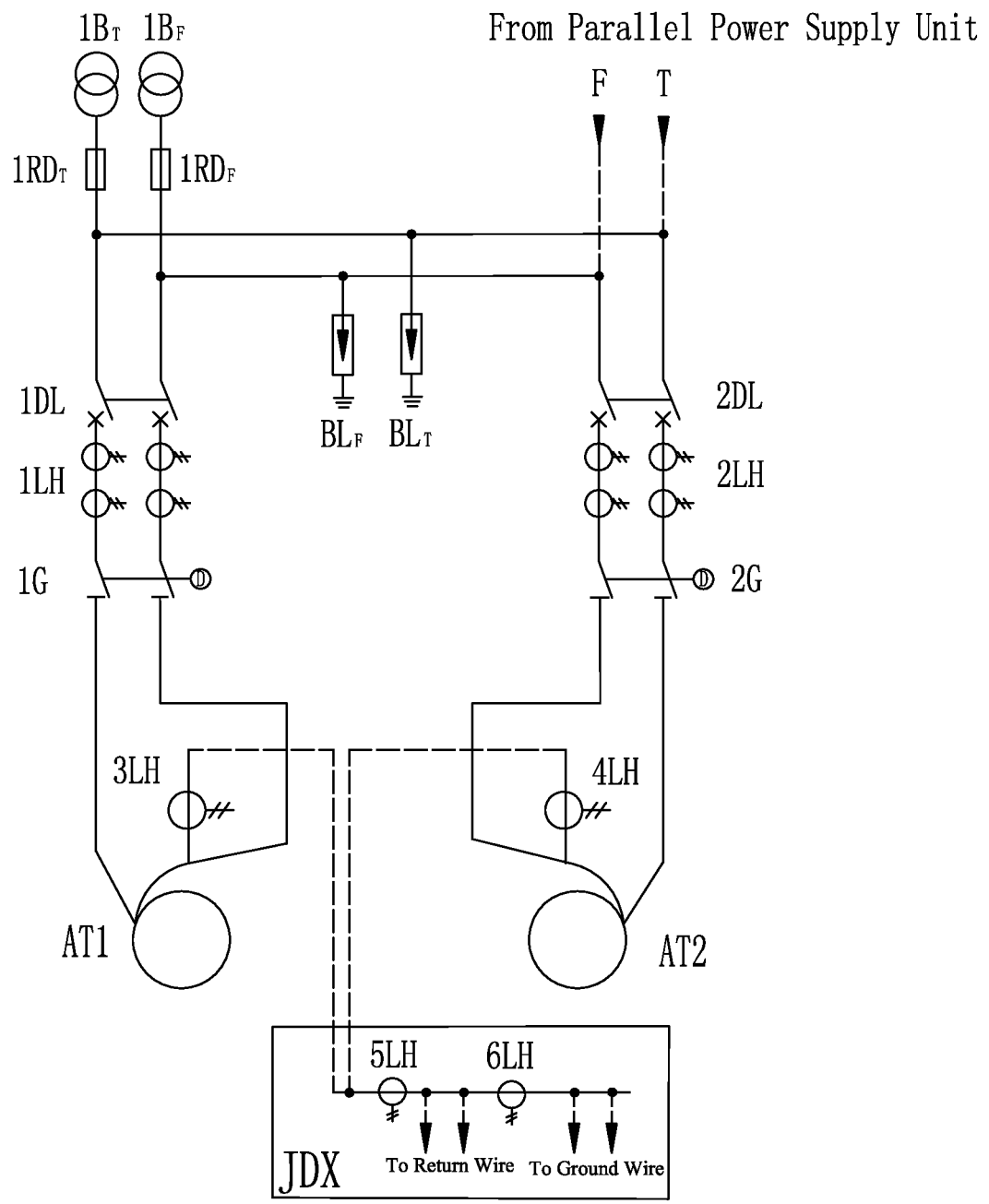
FIG. 10 shows a main connection line of an integrated AT post under the adoption of a 2×27.5 kV outdoor modularized electric apparatus.

In FIG. 10, the integrated AT post only comprises the circuit breaker and the disconnector which supply the AT transformer with power. The circuit breaker and the disconnector which are used for realizing parallel power supply are not located in the AT post. The voltage transformer adopted conventionally is replaced with $1B_T$ and $1B_F$. Power is obtained from the T wire and the F wire of the upper/down traction network, respectively, which not only meets the requirement of the obtained quantity of voltage but also meets the requirement of the electricity needed by the circuit breaker and the disconnector to operate a mechanism.

The integrated AT post has only two circles of 27.5 kV cable inlet and outlet wire. The 27.5 kV cable inlet and outlet wire of the improved AT post are less by two circles than that of the prior AT post.

Figure 11:
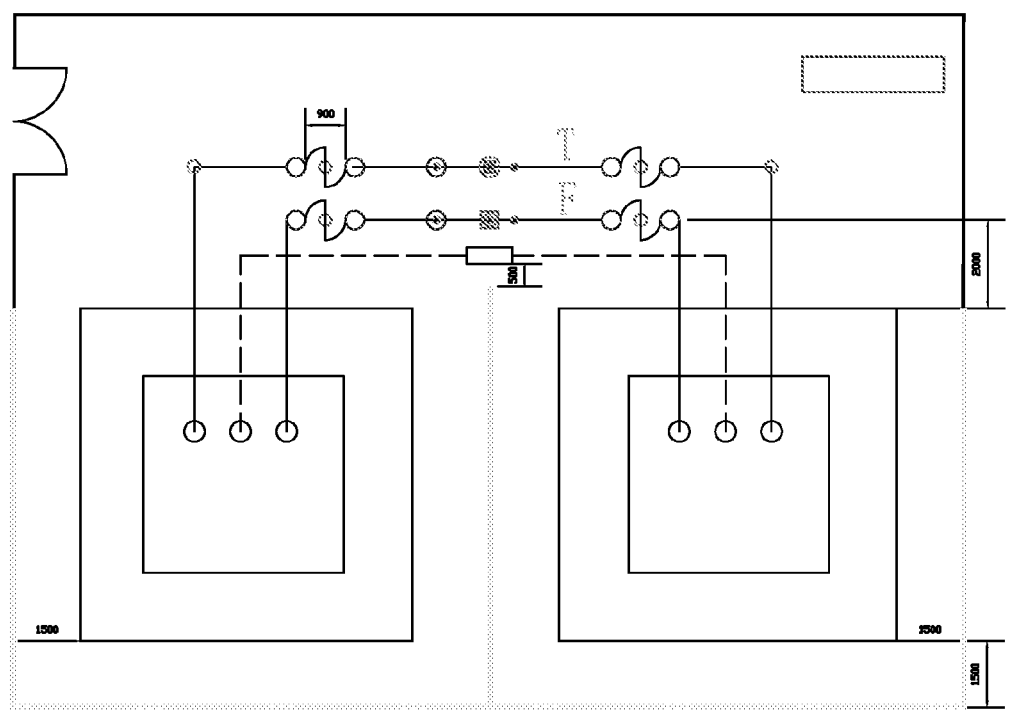
FIG. 11 shows a general arrangement plan of an integrated AT post under the adoption of a 2×27.5 kV outdoor modularized electric apparatus (unit: mm).

In FIG. 11, the circuit breaker, the disconnector and the AT transformer are located according to compact method. The firewalls are arranged between the two AT transformers. The wall near the AT transformer is in firewall type. The firewall is built to have a gate, which meets the transport requirements of equipment. All of the second control and protection apparatuses of the comprehensive automation system, the video monitoring system, telecontrol system and telecommunication system, as well as 10/0.4 kV transformer and AC and DC auxiliary power system are located within one outdoor preassembled protection measurement and control cabinet. The preassembled protection measurement and control cabinet is manufactured and carried out with secondary test in factory. The firewall is also manufactured in the factory. Factory manufacture of the firewalls is taken as the major. Base construction and combined debugging are carried out on site, which reduces on-site construction quantity, shortens construction period and saves construction investment.

Figure 7:
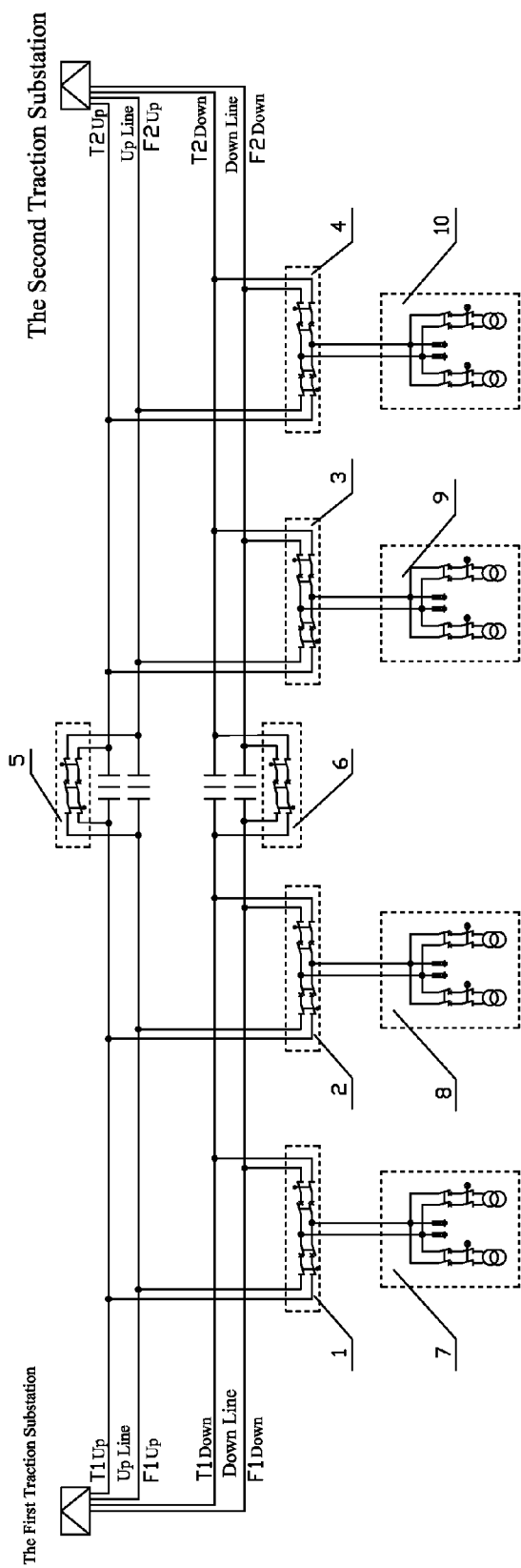
FIG. 7 shows an electric schematic diagram of a new AT traction power supply system under the adoption of a 2×27.5 kV outdoor modularized electric apparatus.
Figure 8:
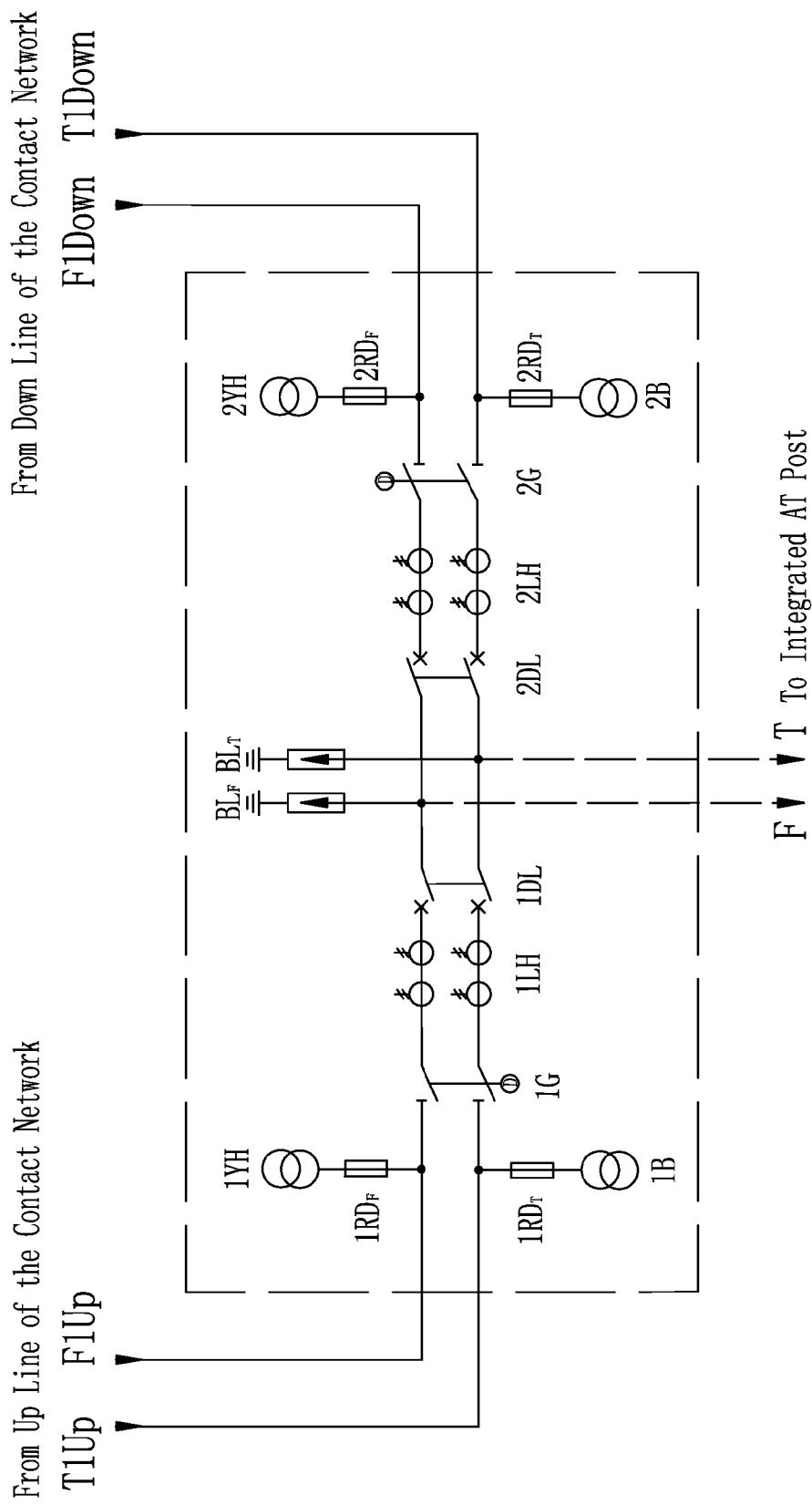
FIG. 8 shows an electric schematic diagram of a parallel power supply unit under the adoption of a 2×27.5 kV outdoor modularized electric apparatus.
Figure 9:
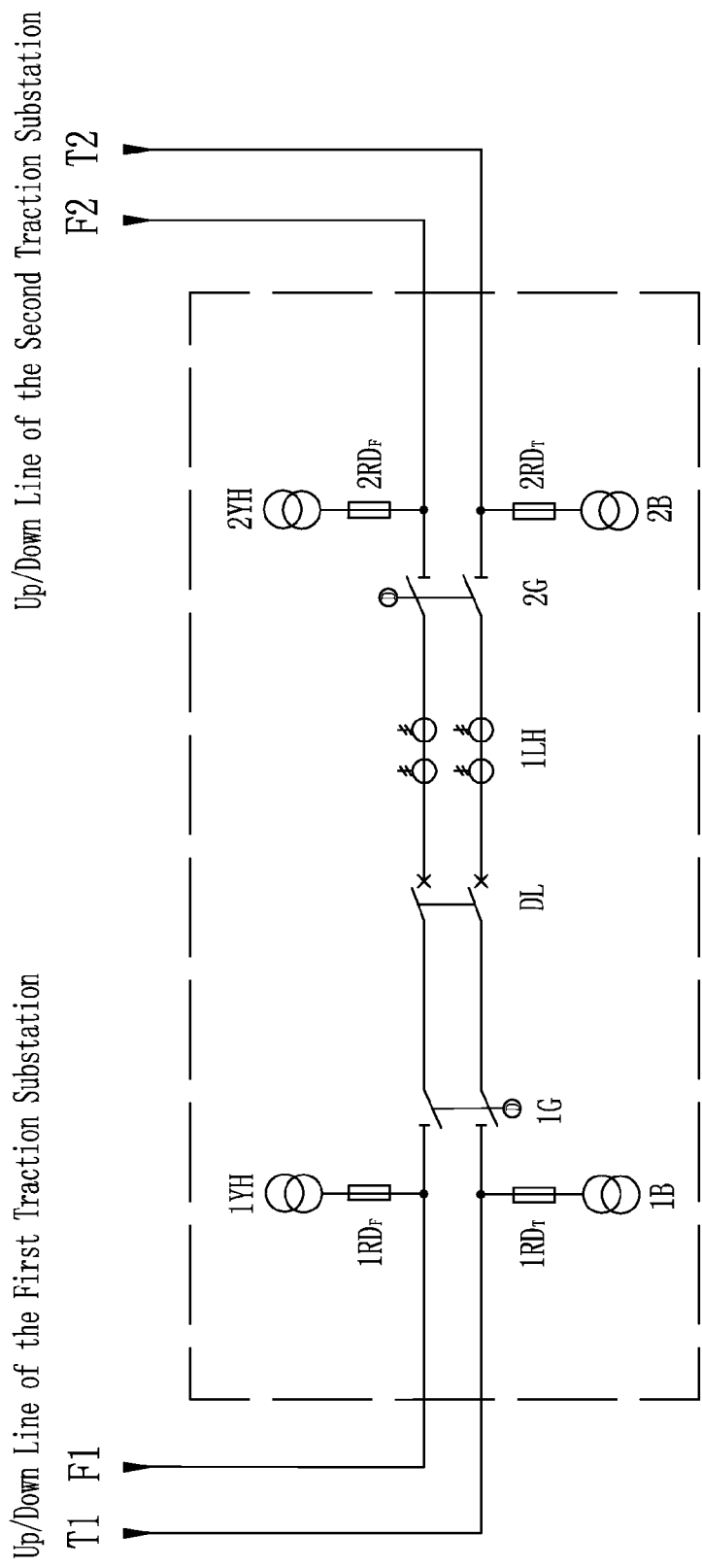
FIG. 9 shows an electric schematic diagram of an over-zone power supply unit under the adoption of a 2×27.5 kV outdoor modularized electric apparatus.

In FIGS. 7, 8 and 9, the implementation proposal of the parallel power supply, integrated AT post and over-zone power supply in the middle of and at the end of a feeder of an upper/a down traction network of a new AT traction power supply system in an electrified railway in a suppositional framework.

In the domestic double-track railway, the railway toward Beijing, city is called as upper line, and the railway departing from Beijing city is called as down line. Similarly, the traction network also has upper lines and down lines. The upper/down line traction network is supplied with power through the circuit breaker of the feed line in the traction substation by the traction power supply system. In FIG. 7, the parallel power supply at the terminal of the feeder is realized through the disconnector and circuit breaker in the parallel power supply unit 2 by the upper/down line traction network supplied by the first traction with power, which reduces voltage loss of the traction network and improves the quality of power supply. When the upper/down line traction network has fault, two circuit breakers of the parallel power supply unit 2 have no a time-delay opening switch and the switch of the circuit breaker of the feed line of the traction substation is opened; therefore, the fault is cleared. After the fault is cleared, an auto-reclosing switch of the circuit breaker of the traction substation is initialized to be closed and supplies power to the traction network again. If the fault is not permanent, two of the circuit breakers of the parallel power supply unit 2 are respectively detected to be in a closing switch with voltage, and parallel power supply is recovered. Similarly, the parallel power supply in the middle of the feeder is realized through the disconnector and circuit breaker in the parallel power supply unit by the upper down line traction network supplied by the first traction substation.

The parallel power supply at the terminal (or in the middle) of the feeder is realized through the disconnector and circuit breaker in the parallel power supply unit 3 (or 4) by the upper/down line traction network supplied by the second traction substation with power.

In FIG. 7, new AT power supply consists of the parallel power supply unit, the integrated AT post and the over-zone power supply unit. The parallel power supply unit 1, the parallel power supply unit 2, parallel power supply unit 3 and parallel power supply unit 4 are four independent units, among which there are not any electric connection. The units can respectively be arranged beside the main line of the railway in the middle or at the terminal of the feeder. The units and the strut of the contact network are located at the same longitudinal axis, thereby meeting side clearance requirements.

Figure 15:
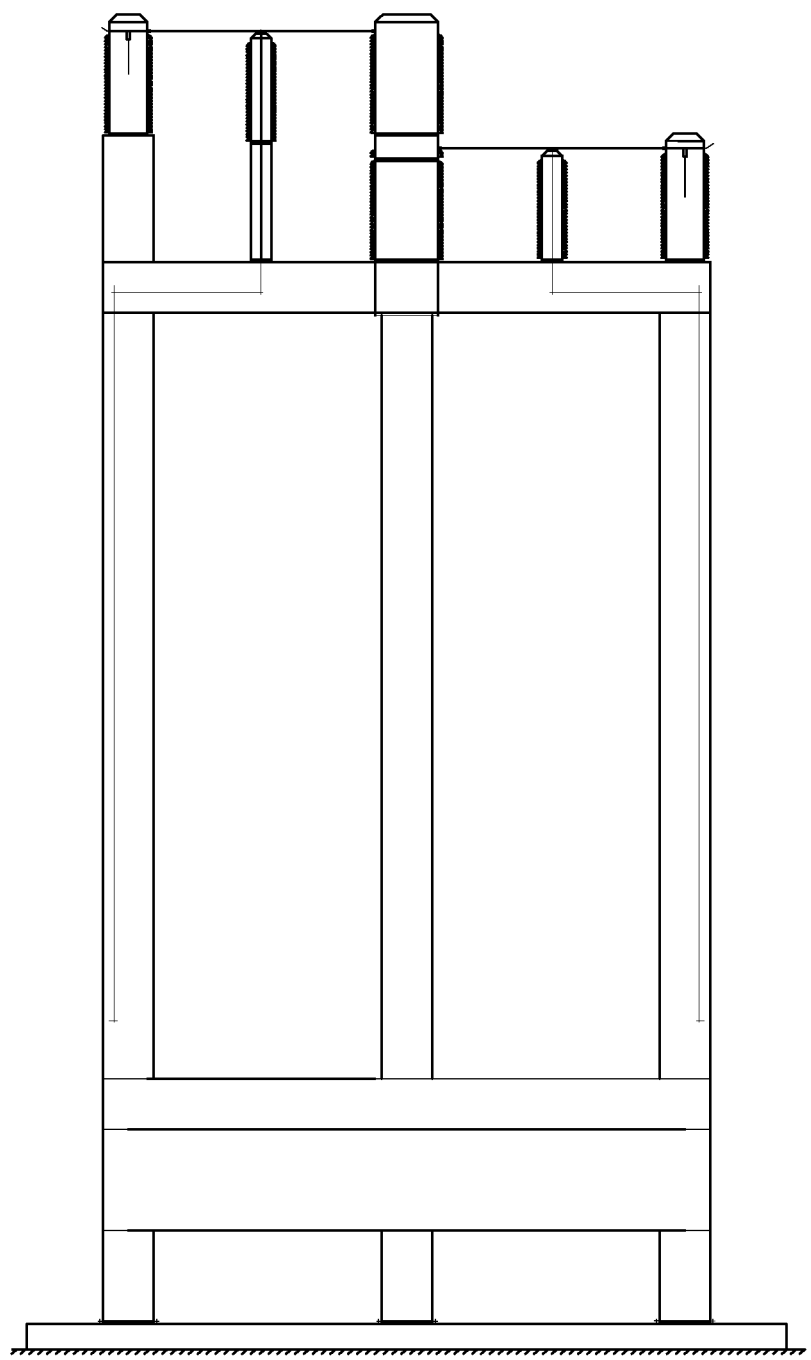
FIG. 15 shows a structure diagram of an outdoor modularized electric apparatus used for an over-zone power supply unit.

When over-zone power supply is taken into account, the spacing (or load) switch can be arranged at the neutral section insulator or the spacing (or load) switch is replaced by "2×27.5 kV outdoor modularized electric apparatus" according to the single circuit breaker proposal shown in FIG. 15. When the adjacent traction substation is out of service because of fault, the over-zone power supply function is fulfilled. When the spacing (or load) switch is replaced with the modularized electric apparatus, the protection for the over-zone power supply can be realized through the circuit breaker, and power-off scope caused by sudden failure of the over-zone feeder when over-zone power supply is carried out is shortened.

According to the method in FIGS. 7, 8 and 10, the parallel power supply unit and the integrated AT post are arranged. Two AT posts have four circles of 27.5 kV cable inlet and outlet wire totally. The 27.5 kV cable inlet and outlet wire of the integrated AT post is less by four circles than those of the prior AT post and the section post. Meanwhile, eight circles of 27.5 kV cable inlet and outlet wire between a high-voltage switch and the autotransformer are eliminated.

Figure 13:
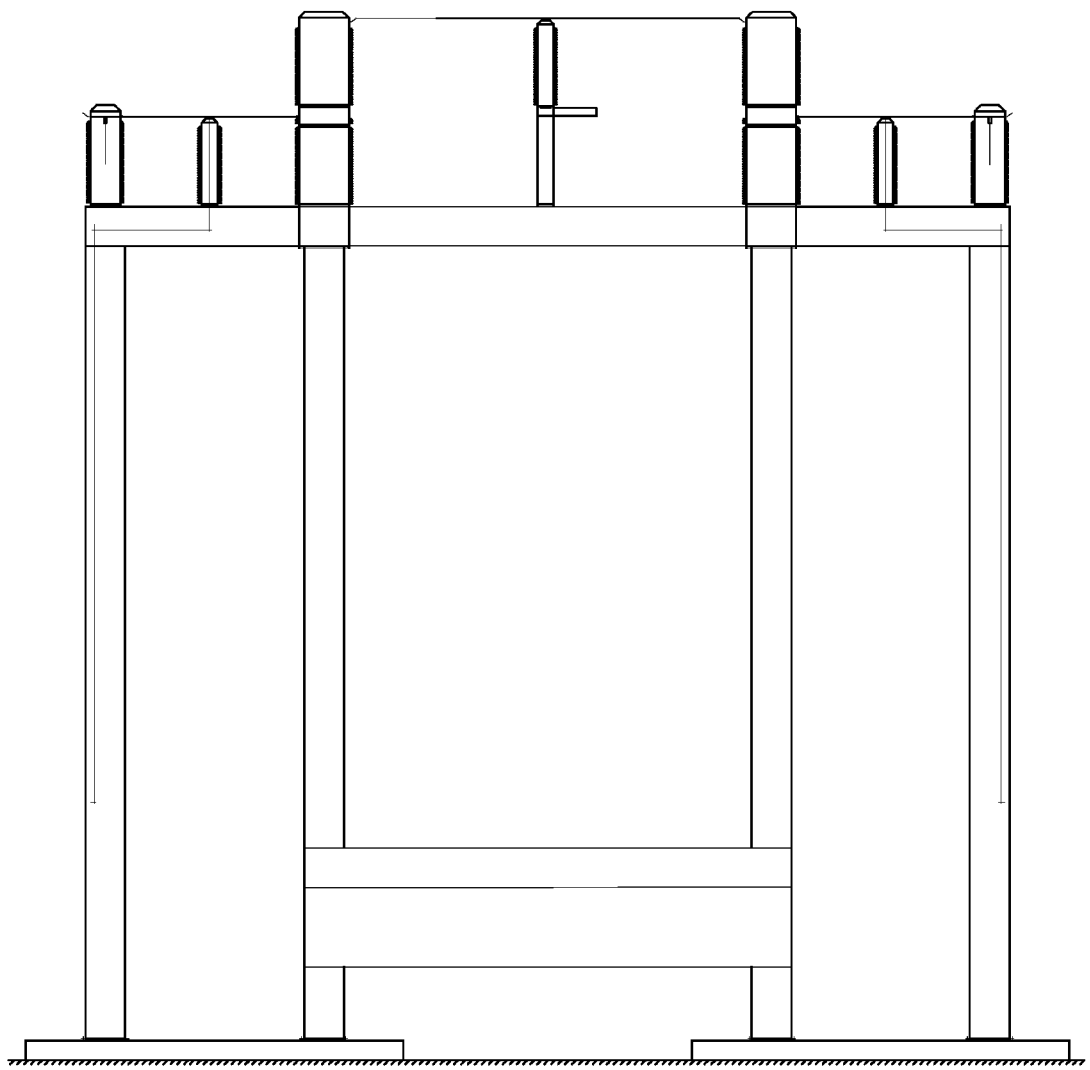
FIG. 13 shows a structure diagram of an outdoor modularized electric apparatus used for a parallel power supply unit.

In FIGS. 8 and 13, the modularized electric apparatus used for parallel power supply comprises the support, the disconnector arranged on the support, the circuit breaker, the miniature transformer, the miniature fuse protector, the voltage transformer, the voltage protector, current transformer, a lightning arrester, the control box and the power box. Two of the disconnectores, two of the circuit breaker and two of the current transformer are in connection in series. Two of the miniature transformers and the miniature fuse protectors are in connection in series. The input terminals of the fuse protectors are respectively connected with the leading-in terminals of the T wire of the traction networks at the two terminals of the modularized electric apparatus. The voltage transformer is replaced by the miniature transformer, which not only can meet the electricity requirements but also can meet the requirements of the obtained quantity of protection voltage. Two of the voltage transformers and the voltage fuse protector are in connection in series. The input terminals of the fuse protector are respectively connected with the leading-in terminals of the F wire of the traction networks at the two of the terminals of the modularized electric apparatus, which meets the requirement of the obtained quantity of the voltage.

In FIGS. 9 and 15, the modularized electric apparatus used for over zone comprises the support, the disconnector arranged on the support, the circuit breaker, the miniature transformer, the miniature fuse protector, the voltage transformer, the voltage fuse protector, the current transformer, the lightning arrestor, the control box and the power box. Two of the disconnectores, one circuit breaker and one current transformer are in connection in series. Two of the miniature transformers and the miniature circuit breaker are in connection in series. The input terminals of the fuse protector are respectively connected with the leading-in terminals of the T wire of the traction network of the modularized electric apparatus. The voltage transformer is replaced with the miniature transformer, which not only can meet the electricity requirement of the modularized electric apparatus but also can meet the requirement of the obtained quantity of the voltage. Tow of the voltage transformers and the voltage fuse protector are in connection in series. The input terminals of the fuse protector are respectively connected with the leading-in terminals of the F wire of the traction networks of the two terminals of the modularized electric apparatus, which meets the requirement of the obtained quantity of protection voltage.

Figure 14:
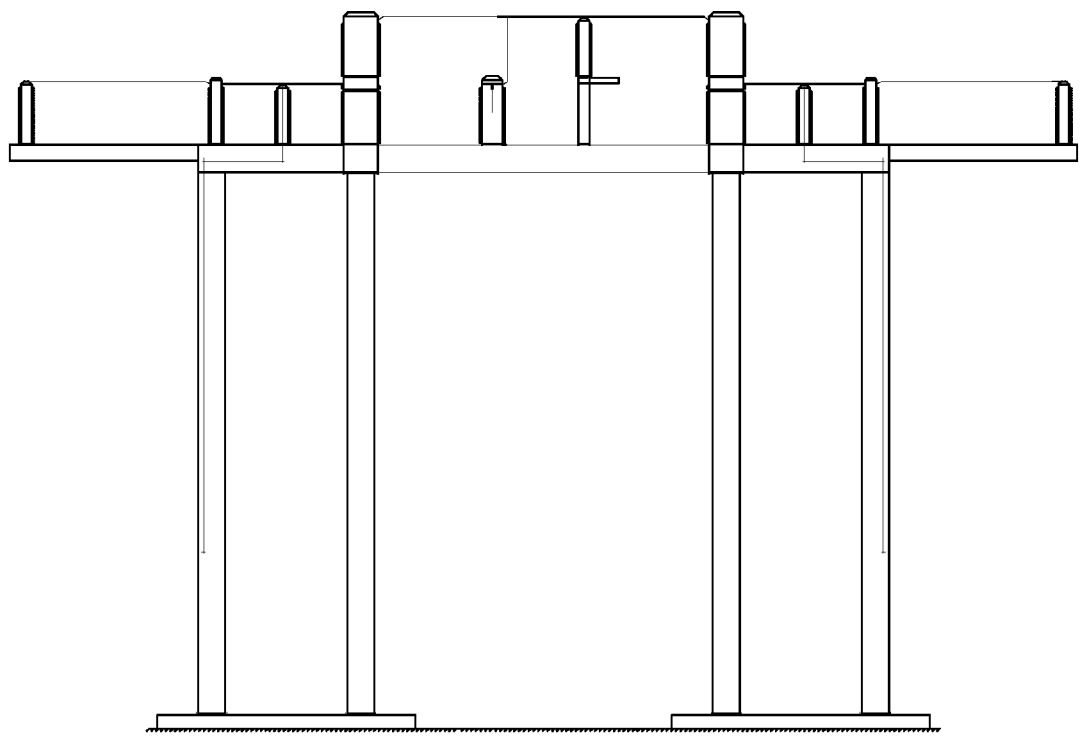
FIG. 14 shows a structure diagram of an outdoor modularized electric apparatus used for an integrated AT post.

In FIGS. 10 and 14, the modularized electric apparatus used for the integrated AT post comprises the support, the disconnector arranged on the support, the circuit breaker, the miniature transformer, the miniature fuse protector, the current transformer and the lighting arrestor. Two of the disconnectores, two of the circuit breaker and two of the current transformers are in connection in series. Two of the miniature transformers and the fuse protector are in connection in series. The input terminals of the fuse protector are respectively connected with the leading-in terminals of the T wire and the F wire in the middle of the modularized electric apparatus. The voltage transformer is replaced with the miniature transformer, which not only can meet the electricity requirements of the modularized electric apparatus but also can meet the obtained quantity of the voltage.

In FIGS. 7, 8 and 10, when the location of the power supply unit is similar to that of the integrated AT post matching the unit, the miniature transformer of the modularized electric apparatus, the miniature fuse transformer thereof, the control box thereof and the power box thereof can be eliminated, which still can meet the requirement of the obtained quantity of the voltage. The operation power is supplied to the disconnector and circuit breaker of the modularized electric apparatus by the outdoor preassembled protection measurement and control cabinet of the integrated AT post, in which the control of the modularized electric apparatus used for parallel power supply, the protection thereof, AC and DC auxiliary electricity thereof, telecommunication thereof and telecontrol thereof can be integrated in the outdoor preassembled protection measurement and control cabinet of the integrated AT post; therefore, the AC and DC auxiliary electricity and the telecommunication apparatus can be shared, which can reduce investment.

Figure 12:
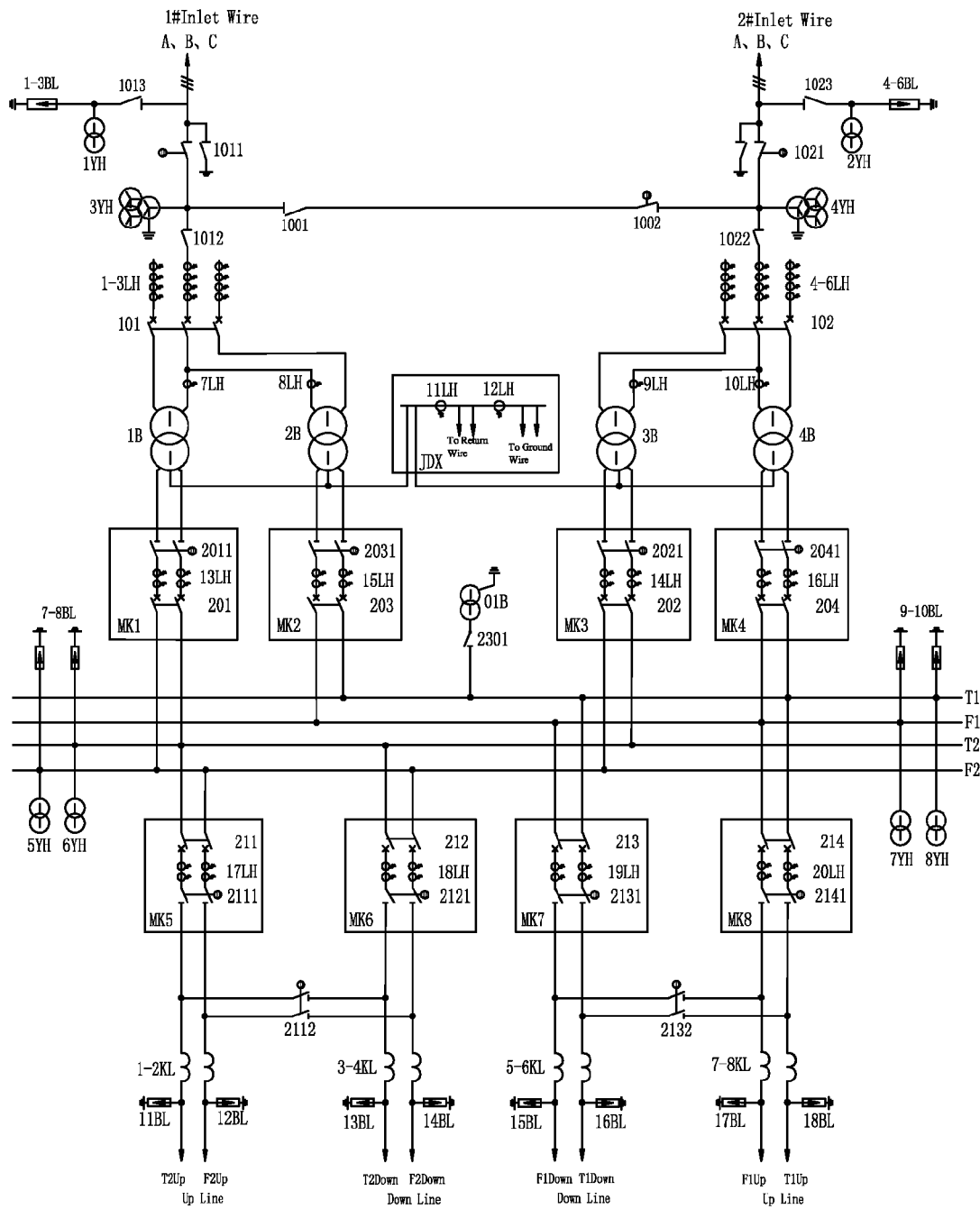
FIG. 12 shows a main connection line of a traction substation under the adoption of a 2×27.5 kV outdoor modularized electric apparatus.

In FIG. 12, the implement proposal of the traction substation in the new AT power supply system in an electrified railway can be found in a suppositional framework.

In FIG. 12, the main apparatuses, such as the circuit breaker, the voltage transformer, the current transformer, the disconnector and so on which are at 2×27.5 kV side of the traction transformer, are located outdoors, wherein the traction transformer is arranged with the switchgear method that the prior traction substation is locate indoors. The apparatuses are respectively assembled into independent modularized electric apparatus according to the suppositional framework and supplies power to the traction network, which not only can meet the requirement of power supply but also can save land and the investment in manufacture houses.

Figure 16:
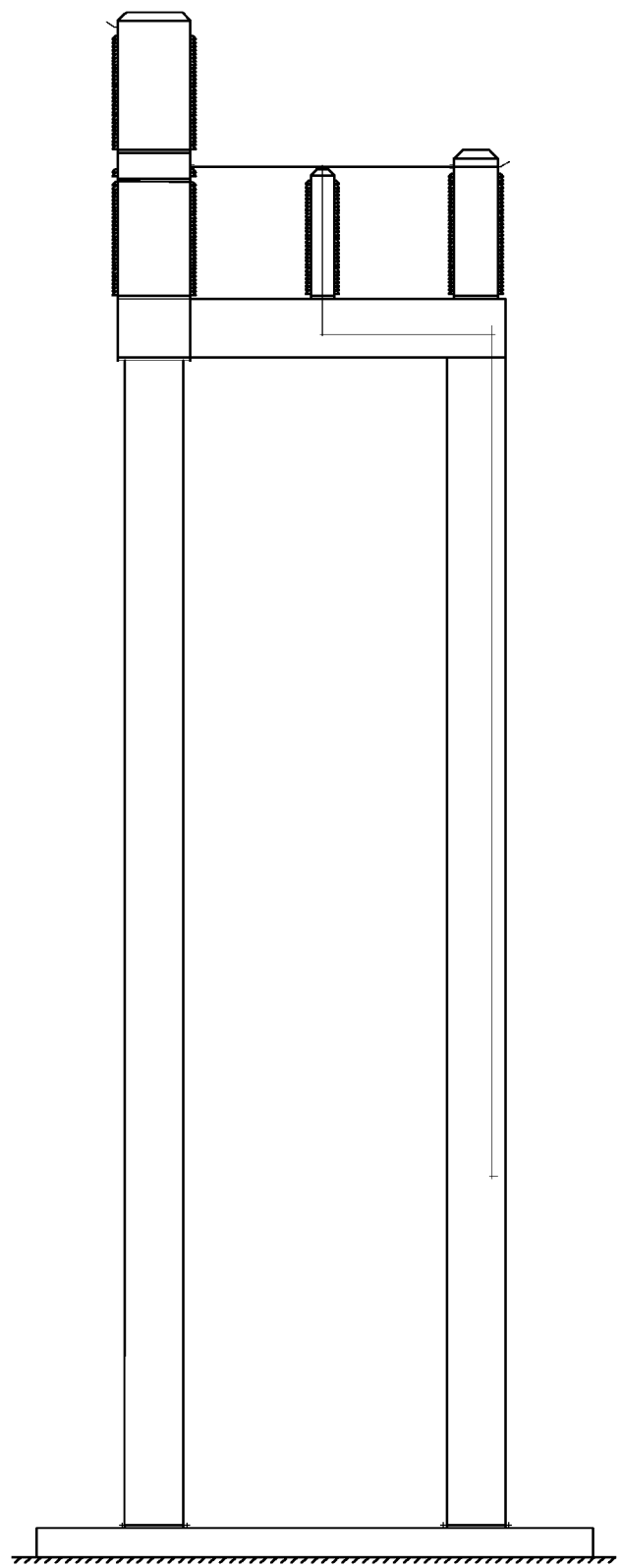
FIG. 16 shows a structure diagram of an outdoor modularized electric apparatus used for a traction substation.

In FIG. 16, the modularized electric apparatus used for the traction substation comprises the support, the disconnector arranged on the support, the circuit breaker and the current transformer, wherein one disconnector, one circuit breaker and one current transformer are in connection in series.

The invention claimed is:

1. A new autotransformer traction power supply system equipped with 2×27.5 kV outdoor modularized electric apparatus in an electrified railway, comprising: a traction substation, which is located beside the electrified railway and of which the output terminal is connected with an up/a down line traction network; the up/a down line traction network, which comprises a contact suspension T Wire and a positive feed line F Wire respectively; a parallel apparatus, which is arranged in the middle and at the end of a feeder of the up/down line traction network, connected with AT equipment and has a function of parallel power supply, and an over-zone apparatus, which is arranged at a neutral section insulator between feeders of the up/down line traction network of two adjacent traction substations and has the function of over-zone power supply; the parallel apparatus is connected with an AT apparatus; wherein the parallel apparatus comprises a first parallel power supply unit, a second parallel power supply unit, a third parallel power supply unit and a fourth parallel power supply unit; the over-zone apparatus comprises a first over-zone power supply unit and a second over-zone power supply unit; the AT apparatus is a first integrated AT post, a second integrated AT post, a third integrated AT post and a fourth AT post; the first parallel power supply unit is connected with the first integrated AT post; the second parallel power supply unit is connected with the second integrated AT post; the third parallel power supply unit is connected with the third integrated AT post; the fourth parallel power supply unit is connected with the fourth integrated AT post;

the first parallel power supply unit, the second parallel power supply unit, the third parallel power supply unit and the fourth parallel power supply unit are a modularized electric apparatus used for parallel power supply; the modularized electric apparatus used for parallel power supply comprises a first up-line input terminal, a second up-line input terminal, a first down-line input terminal and a second down-line input terminal; the first up-line input terminal and the second up-line input terminal are respectively connected with T wire and F wire of the up-line traction network; the first down-line input terminal and the second down-line input terminal are connected with the T wire and the F wire of the down-line traction networks;

the modularized electric apparatus used for power supply comprises a support, a first parallel up-line branch circuit arranged on the support, a first parallel down-line branch circuit, a second parallel up-line branch circuit, a second parallel down-line branch circuit, a parallel power supply control box and a parallel power supply power box; the first parallel up-line branch circuit and a first parallel down-line branch circuit are in connection in series; the second parallel up-line branch circuit and the second parallel down-line branch circuit are in connection in series;

the first parallel up-line branch circuit comprises a first up-line spacing switch, a first parallel power-supply up-line current transformer, a first parallel power-supply up-line circuit breaker, a first parallel power-supply up-line miniature transformer and a first parallel power-supply up-line fuse protector; the first parallel power-supply up-line spacing switch, the first parallel power-supply up-line current transformer and the first parallel power-supply up-line circuit breaker are in connection in series; the first parallel power-supply up-line miniature transformer and the first parallel power-supply up-line are in connection in series; the input terminal of the first up-line fuse protector is connected with the first up-line input terminal of the modularized electric apparatus used for parallel power supply;

the first parallel down-line branch circuit comprises a first parallel power-supply down-line spacing switch, a first parallel power-supply down-line current transformer, a first parallel power-supply down-line circuit breaker and a first parallel power-supply down-line miniature transformer and a first parallel power-supply down-line fuse protector; the first parallel power-supply down-line spacing switch, the first parallel power-supply down-line current transformer and the first parallel power-supply down-line circuit breaker are in connection in series; the first parallel power-supply down-line miniature transformer and the first parallel power-supply down-line fuse protector are in connection in series; the input terminal of the first down-line fuse protector is connected with the first down-line input terminal of the modularized electric apparatus used for parallel power supply;

the second parallel up-line branch circuit comprises a second parallel power-supply up-line spacing switch, a second parallel power-supply up-line current transformer, a second parallel power-supply up-line circuit breaker, a second parallel power-supply up-line voltage transformer and a second parallel power-supply up-line fuse protector; the second parallel power-supply up-line spacing switch, the second parallel power-supply up-line current transformer and the second parallel power-supply up-line circuit breaker are in connection in series; the second parallel power-supply up-line voltage transformer and the second parallel power-supply up-line fuse protector are in connection in series; the input terminal of the second up-line fuse protector is connected with the second up-line input terminal of the modularized electric apparatus used for parallel power supply;

the second parallel down-line branch circuit comprises a second parallel power-supply down-line spacing switch, a second parallel power-supply down-line current transformer, a second parallel power-supply down-line circuit breaker, a second parallel power-supply down-line voltage transformer and a second parallel power-supply down-line fuse protector; the second parallel power-supply down-line spacing switch, the second parallel power-supply down-line current transformer, the second parallel power-supply down-line circuit breaker are in connection in series; the second parallel power-supply down-line voltage transformer and the second parallel power-supply down-line fuse protector are in connection in series; the input terminal of the second down-line fuse protector is connected with the second down-line input terminal of the modularized electric apparatus used for parallel power supply;

all of the second output terminals of the first parallel power-supply up-line current transformer, the first parallel power-supply current transformer, the second parallel power-supply up-line current transformer, the second parallel power-supply up-line voltage transformer, the second parallel power-supply down-line current transformer and the second parallel power-supply down-line voltage transformer are connected with the parallel power-supply control box; the second output terminals of the first parallel power-supply up-line miniature transformer, the first parallel power-supply down-line miniature transformer are connected with the parallel power-supply power box; the voltage detection signals of the first parallel power-supply up-line branch circuit and the first parallel power-supply up-line branch circuit of the parallel power-supply control box are drawn down from the parallel power-supply power box;

the connection nodes of the first parallel up-line branch circuit and the first parallel down-line branch circuit are connected with the T input terminal of the integrated AT post corresponding to the parallel power supply unit; the connection nodes of the second parallel up-line branch circuit and the second parallel down-line branch circuit are connected with the F input terminal of the integrated AT post corresponding to the parallel power supply unit.

2. The AT traction power supply system equipped with 2×27.5 kV outdoor modularized electric apparatus in an electrified railway of claim 1, wherein the integrated AT post comprises a first AT transformer, a second AT transformer and a modularized electric apparatus used for the AT post; the first input terminal T and second input terminal F of the modularized electric apparatus used for the AT post is connected with the T wire and F wire of the output terminal of the modularized electric apparatus used for the parallel power supply; the modularized electric apparatus used for the AT post is connected with the first AT transformer and the second AT transformer; the grounding terminals of the first AT transformer and the second AT transformer are connected with return wires and a grounding network. Firewalls are arranged between the first AT transformer and the second AT transformer;

the modularized electric apparatus used for the AT post comprises a support and a first branch circuit of the T wire arranged on the support, the first branch circuit of the F wire arranged on the support, the first branch circuit of the F wire arranged on the support, a second branch circuit of the T wire arranged on the support and the second branch circuit of the F wire;

the first branch circuit of the T wire comprises the first circuit breaker of the T wire, the first current transformer of the T wire, the first spacing switch of the T wire, the first miniature transformer of the T wire and the first fuse protector of the T wire; the first circuit breaker of the T wire, the first current transformer of the T wire and the first spacing switch of the T wire are in connection in series; the input terminal of the first fuse protector of the T wire is connected with the input terminal of the T wire; the output terminal of the first spacing switch of the T wire is connected with the input terminal of the T wire of the first AT transformer;

the first branch circuit of the F wire comprises the first circuit breaker of the F wire, the first current transformer of the F wire, the first spacing switch of the F wire, the first miniature transformer of the F wire and the first fuse protector of the F wire; the first circuit breaker of the F wire, the first current transformer of the F wire and the first spacing switch of the F wire are in connection in series; the first miniature transformer of the F wire and the first fuse protector are in connection in series; the input terminal of the first fuse protector of the F wire is connected with the input terminal of the F wire; the output terminal of the first spacing switch of the F wire is connected with the input terminal of the F wire of the first AT transformer;

the second branch circuit of the T wire comprises the second circuit breaker of the T wire, the second current transformer of the T wire and the second spacing switch of the T wire; the second circuit breaker of the T wire, the second current transformer of the T wire and the second spacing switch of the T wire are in connection in series; the input terminal of the second circuit breaker of the T wire is connected with the input terminal of the T wire; the output terminal of the second spacing switch of the T wire is connected with the input terminal of the T wire of the second AT transformer;

the second branch circuit of the F wire comprises the second circuit breaker of the F wire, the second current transformer of the T wire and the second spacing switch of the T wire; the second circuit breaker of the F wire, the second current transformer of the T wire and the second spacing switch of the T wire are in connection in series; the input terminal of the second circuit breaker of the F wire is connected with the input terminal of the F wire; the output terminal of the second spacing switch of the F wire is connected with the input terminal of the F wire of the second AT transformer;

all of the second output terminals of the first current transformer of the T wire, the first miniature transformer of the T wire, the first current transformer of the F wire, the first miniature transformer of the F wire, the second current transformer of the T wire and the second current transformer of the F wire are connected with the outdoor preassembled protection measurement control cabinet of the integrated AT post.

3. The AT traction power supply system equipped with 2×27.5 kV outdoor modularized electric apparatus in an electrified railway of claim 1 or 2, wherein the first over-zone power supply unit and the second over-zone power supply unit are both the modularized electric apparatus used for over-zone power supply; the modularized electric apparatus used for the over-zone power supply comprises the first over-zone input terminal, the second over-zone input terminal, the first over-zone output and the second over-zone output terminal; the modularized electric apparatus comprises the support, the first over-zone branch circuit arranged on the support, the second over-zone branch circuit, the over-zone control box and the over-zone power box;

the first over-zone branch circuit comprises the first over-zone left-side spacing switch, the first over-zone circuit breaker, the first over-zone current transformer, the first over-zone right-side spacing switch, the first over-zone left-side miniature transformer, the first over-zone left-side fuse protector, the first over-zone right-side miniature transformer and the first over-zone right-side fuse protector; the first over-zone left-side spacing switch, the first over-zone circuit breaker, the first over-zone current transformer and the first over-zone right-side spacing switch are in connection in series; the first over-zone left-side miniature transformer and the first over-zone left-side fuse protector are in connection in series; the input terminal of the first over-zone left-side fuse protector is connected with the first over-zone input terminal; the first over-zone right-side miniature transformer and the first over-zone right-side fuse protector are in connection in series; the input terminal of the first over-zone right-side miniature transformer and the first over-zone right-side fuse protector are in connection in series; the input terminal of the first over-zone right-side fuse protector is connected with the first over-zone output terminal;

the second over-zone branch circuit comprises the second over-zone left-side spacing switch, the second over-zone circuit breaker, the second over-zone current transformer, the second over-zone right-side spacing switch, the second over-zone left-side miniature transformer, the second over-zone left-side fuse protector, the second over-zone right-side miniature transformer and the second over-zone right-side fuse protector; the second over-zone left-side spacing switch, the second over-zone circuit breaker, the second over-zone current transformer and the second over-zone right-side spacing switch are in connection in series; the second over-zone left-side miniature transformer and the second over-zone left-side fuse protector are in connection in series; the input terminal of the second over-zone left-side fuse protector is connected with the second over-zone input terminal; the second over-zone right-side miniature transformer and the second over-zone right-side fuse protector are in connection in series; the input terminal of the second over-zone right-side miniature transformer and the second over-zone right-side fuse protector are in connection in series; the input terminal of the second over-zone right-side fuse protector is connected with the second over-zone output terminal;

all of the second output terminals of the first over-zone current transformer, the second over-zone voltage transformer, the second over-zone right-side voltage transformer are connected with the over-zone control box; the second output terminals of the first over-zone left-side miniature transformer and the first over-zone left-side miniature transformer are connected with the over-zone control box; the voltage detection signals of the left and the right sides of the first over-zone branch circuit of the over-zone control box are drawn down from the over-zone power box.

4. The AT traction power supply system equipped with 2×27.5 kV outdoor modularized electric apparatus in an electrified railway of claim 1, wherein the 2×27.5 kV side and the up/down-line feed line output side of the traction transformer of the traction substation are both the modularized electric apparatus used for output; the modularized electric apparatus used for output comprises the support, the output circuit breaker arranged on the support, the output current transformer and the output spacing switch; the modularized electric apparatus used for output comprises the two input terminals of the T wire and the F wire and two output terminals of the T wire and the F wire; the modularized electric apparatus used for output comprises two output branch circuits; each output branch circuit is the output circuit breaker, the output current transformer and the output spacing switch which are in connection in series; the two input terminals of the modularized electric apparatus used for output at 2×27.5 kV side of the traction transformer are respectively connected with the output terminals of the T wire and the F wire of the traction transformer; the two output terminals of the modularized electric apparatus used for output at 2×27.5 kV side of the traction transformer are respectively connected with the outdoor T bus and the outdoor F bus of the traction transformer; two of the input terminals of the modularized electric apparatus used for output of the up/down-line feed lines are respectively connected with the outdoor T bus and the outdoor F bus of the traction substation; two of the output terminals of the modularized electric apparatus used for output of the up/down-line feed lines are respectively connected with the input terminals of the T wire and the F wire of a thunder resistance circle of the up/down-line feed lines; the backup contact spacing switch is arranged between two of the modularized electric apparatuses used for output of the up/down-line feed lines;

the second output terminals of the current transformer of output are connected with the outdoor preassembled protection measurement control cabinet of the traction substation.

5. The AT traction power supply system equipped with 2×27.5 kV outdoor modularized electric apparatus in an electrified railway of claim 1, wherein the circuit elements of the modularized electric apparatus used for parallel power supply are all fixed, sealed and combined together with epoxy resin.

6. The AT traction power supply system equipped with 2×27.5 kV outdoor modularized electric apparatus in an electrified railway of claim 2, wherein as for the integrated AT post, the modularized electric apparatus used for the AT post, an autotransformer, the outdoor box preassembled protection measurement control cabinet and a steel-structure wall which matches a support, has firewall function and can be openable are integrated as a whole.

7. The AT traction power supply system equipped with 2×27.5 kV outdoor modularized electric apparatus in an electrified railway of claim 2, wherein all of the circuit elements of the modularized electric apparatus used for the AT post are fixed, sealed and combined as a whole with epoxy resin.

8. The AT traction power supply system equipped with 2×27.5 kV outdoor modularized electric apparatus in an electrified railway of claim 3, wherein all of the circuit elements of the modularized electric apparatus used for the over zone are fixed, sealed and combined as a whole with epoxy resin.

9. The AT traction power supply system equipped with 2×27.5 kV outdoor modularized electric apparatus in an electrified railway of claim 4, wherein all of the circuit elements of the modularized electric apparatus used for output at the 2×27.5 kV side of the traction transformer of the traction substation and the output side of the up/down-line feed lines are fixed, sealed and combined together with epoxy resin.

10. The AT traction power supply system equipped with 2×27.5 kV outdoor modularized electric apparatus in an electrified railway of claim 2, wherein the 2×27.5 kV side and the up/down-line feed line output side of the traction transformer of the traction substation are both the modularized electric apparatus used for output; the modularized electric apparatus used for output comprises the support, the output circuit breaker arranged on the support, the output current transformer and the output spacing switch; the modularized electric apparatus used for output comprises the two input terminals of the T wire and the F wire and two output terminals of the T wire and the F wire; the modularized electric apparatus used for output comprises two output branch circuits; each output branch circuit is the output circuit breaker, the output current transformer and the output spacing switch which are in connection in series; the two input terminals of the modularized electric apparatus used for output at 2×27.5 kV side of the traction transformer are respectively connected with the output terminals of the T wire and the F wire of the traction transformer; the two output terminals of the modularized electric apparatus used for output at 2×27.5 kV side of the traction transformer are respectively connected with the outdoor T bus and the outdoor F bus of the traction transformer; two of the input terminals of the modularized electric apparatus used for output of the up/down-line feed lines are respectively connected with the outdoor T bus and the outdoor F bus of the traction substation; two of the output terminals of the modularized electric apparatus used for output of the up/down-line feed lines are respectively connected with the input terminals of the T wire and the F wire of a thunder resistance circle of the up/down-line feed lines; the backup contact spacing switch is arranged between two of the modularized electric apparatuses used for output of the up/down-line feed lines;

the second output terminals of the current transformer of output are connected with the outdoor preassembled protection measurement control cabinet of the traction substation.

11. The AT traction power supply system equipped with 2×27.5 kV outdoor modularized electric apparatus in an electrified railway of claim 6, wherein all of the circuit elements of the modularized electric apparatus used for the AT post are fixed, sealed and combined as a whole with epoxy resin.

12. The AT traction power supply system equipped with 2×27.5 kV outdoor modularized electric apparatus in an electrified railway of claim 10, wherein all of the circuit elements of the modularized electric apparatus used for output at the 2×27.5 kV side of the traction transformer of the traction substation and the output side of the up/down-line feed lines are fixed, sealed and combined together with epoxy resin.

\* \* \* \* \*